United States Patent
Sako

(10) Patent No.: US 6,643,405 B1
(45) Date of Patent: Nov. 4, 2003

(54) IMAGE PROCESSING APPARATUS AND METHOD AND COMPUTER-READABLE STORAGE MEDIUM

(75) Inventor: Tsukasa Sako, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,301

(22) Filed: Sep. 29, 1999

(30) Foreign Application Priority Data

Sep. 30, 1998 (JP) ............................................ 10-279092
Mar. 26, 1999 (JP) ............................................ 11-084382

(51) Int. Cl.$^7$ ................................................. G06K 9/36
(52) U.S. Cl. ....................... 382/239; 382/232; 382/240; 382/244
(58) Field of Search ................................. 382/232, 239, 382/251, 253, 100, 240, 244, 246; 386/68, 112; 375/240.16

(56) References Cited

U.S. PATENT DOCUMENTS 5,778,102 A * 7/1998 Sandford, II et al. ....... 382/251
5,859,949 A * 1/1999 Yanagihara ................... 386/68
5,978,544 A * 11/1999 Shimada et al. ............. 386/112
6,192,138 B1 * 2/2001 Yamadaji ..................... 382/100
6,215,910 B1 * 4/2001 Chaddha ...................... 382/253
6,272,180 B1 * 8/2001 Lei ......................... 375/240.16

OTHER PUBLICATIONS

Wilberg et al., "Design of an Embedded Video Compression System—A Quantitative Approach", IEEE International Conference on Computer Design, Oct. 1994, pp. 428–431.*

* cited by examiner

*Primary Examiner*—Anh Hong Do
(74) *Attorney, Agent, or Firm*—Fitzpatrick, Cella, Harper & Scinto

(57) ABSTRACT

It is an object to obtain compressed image data in which a compression ratio has been recorded. To accomplish it, an image processing method has a first compressing step of compressing by using an input image, a calculating step of calculating a compression ratio for the input image on the basis of a result of the compression in the first compressing step, an embedding step of embedding information indicative of the calculated compression ratio into the input image and a second compressing step of compressing the input image in which the information showing the compression ratio has been recorded in the embedding step.

14 Claims, 28 Drawing Sheets

FIG. 5

| PROCESS CONTENT | SETTING METHOD | DEFAULT VALUE | PARAMETER FOR NATURAL REDUCTION IMAGE PROCESS | PARAMETER FOR NATURAL IMAGE |
|---|---|---|---|---|
| IRRADIATION FIELD RECOGNITION | AUTOMATIC | AUTOMATIC | AUTOMATIC | EQUAL TO DETERMINED VALUE |
| | DESIGNATE | X, Y, W, H | COORDINATE SYSTEM X/8, Y/8, W/8, H/8 OF 1/8 TIMES DEFAULT VALUE | COORDINATE SYSTEM OF 1/8 TIMES DETERMINED VALUE |
| IMAGE EMPHASIS | 0 (NORMAL) 10 (THIN) 20 (MIDDLE) 30 (STRONG) | N | 1/2 TIMES DEFAULT N | 2 TIMES DETERMINED VALUE |
| GRADATION CONVERSION | AUTOMATIC | AUTOMATIC | AUTOMATIC | EQUAL TO DETERMINED VALUE |

ATTENTION: NATURAL IMAGE IS 2688×2688×12 BITS, NATURAL REDUCTION IMAGE IS 336×336×12 BITS

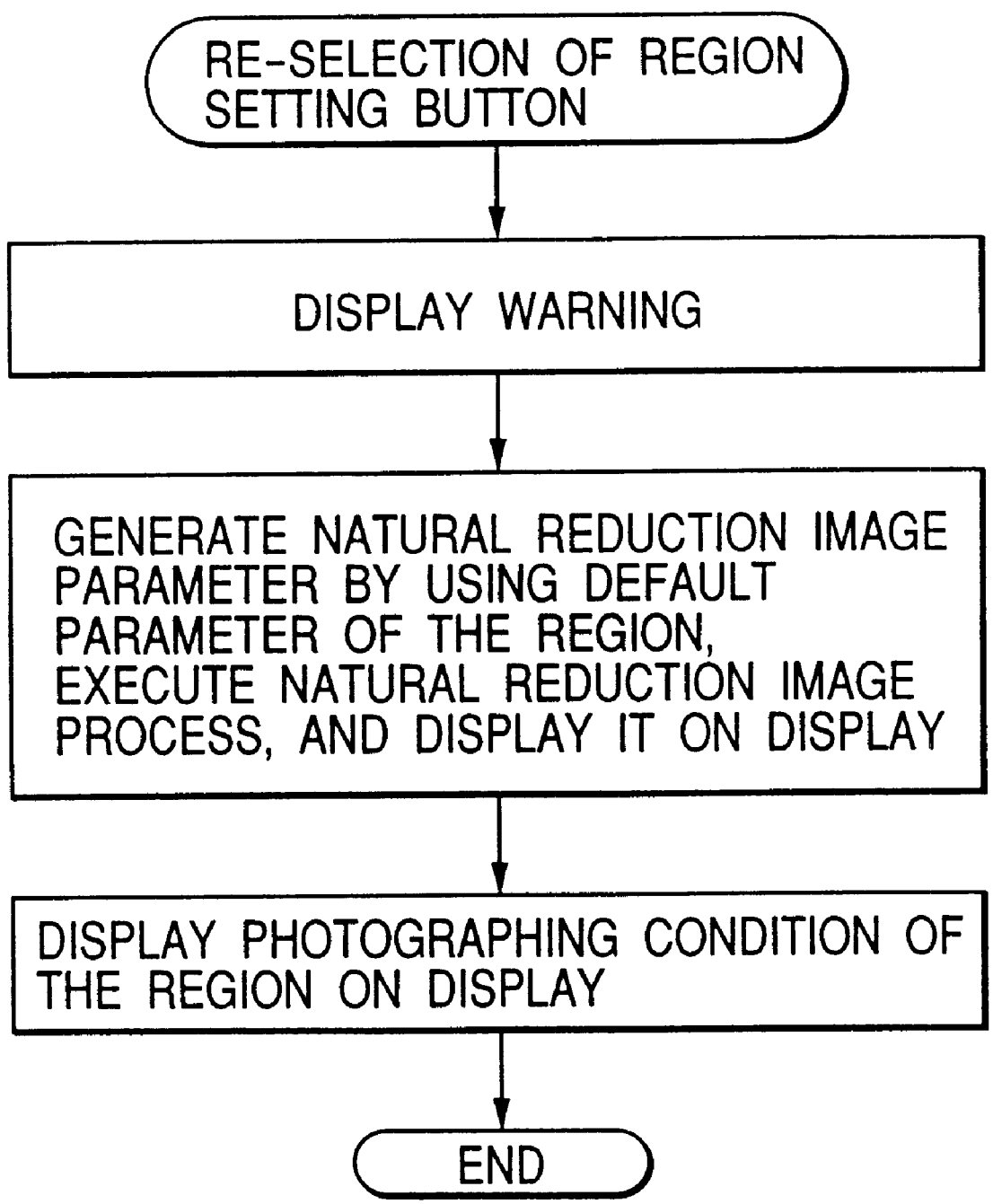

FIG. 8

| | |
|---|---|
| INSPECTION ATTRIBUTION | PATIENT ATTRIBUTION |
| | INSPECTION SPECIFIC ATTRIBUTION |
| | THE NUMBER OF PHOTOGRAPHED IMAGES |
| IMAGE ATTRIBUTION OF FIRST IMAGE | REGION NAME |
| | PHOTOGRAPHING CONDITION |
| | NATURAL IMAGE PROCESSING CONDITION |
| | NON-REVERSIBLE COMPRESSING COEFFICIENT |
| | NON-REVERSIBLE COMPRESSING RATIO |
| | NATURAL IMAGE FILE NAME |
| IMAGE ATTRIBUTION OF SECOND IMAGE | DITTO |
| | ⋮ |
| IMAGE ATTRIBUTION OF N-TH IMAGE | DITTO |

FIG. 9

| QID | IMAGE PROCESS | TRANSFER 1 | TRANSFER 2 | TRANSFER 3 | TRANSFER 4 | ERASE | INSPECTION FILE NAME |
|---|---|---|---|---|---|---|---|
| 2329 | DONE | DONE | DONE | DONE | RUNNING (TID=1) | UNDONE | F02329.QUE |
| 2330 | RUNNING (TID=2) | UNDONE | UNDONE | UNDONE | UNDONE | UNDONE | F02330.QUE |
| 2331 | UNDONE | UNDONE | UNDONE | UNDONE | UNDONE | UNDONE | F02331.QUE |
| 2332 | UNDONE | UNDONE | UNDONE | UNDONE | UNDONE | UNDONE | F02332.QUE |
| 2333 | UNDONE | UNDONE | UNDONE | UNDONE | UNDONE | UNDONE | F02333.QUE |
| 2334 | UNDONE | UNDONE | UNDONE | UNDONE | UNDONE | UNDONE | F02334.QUE |

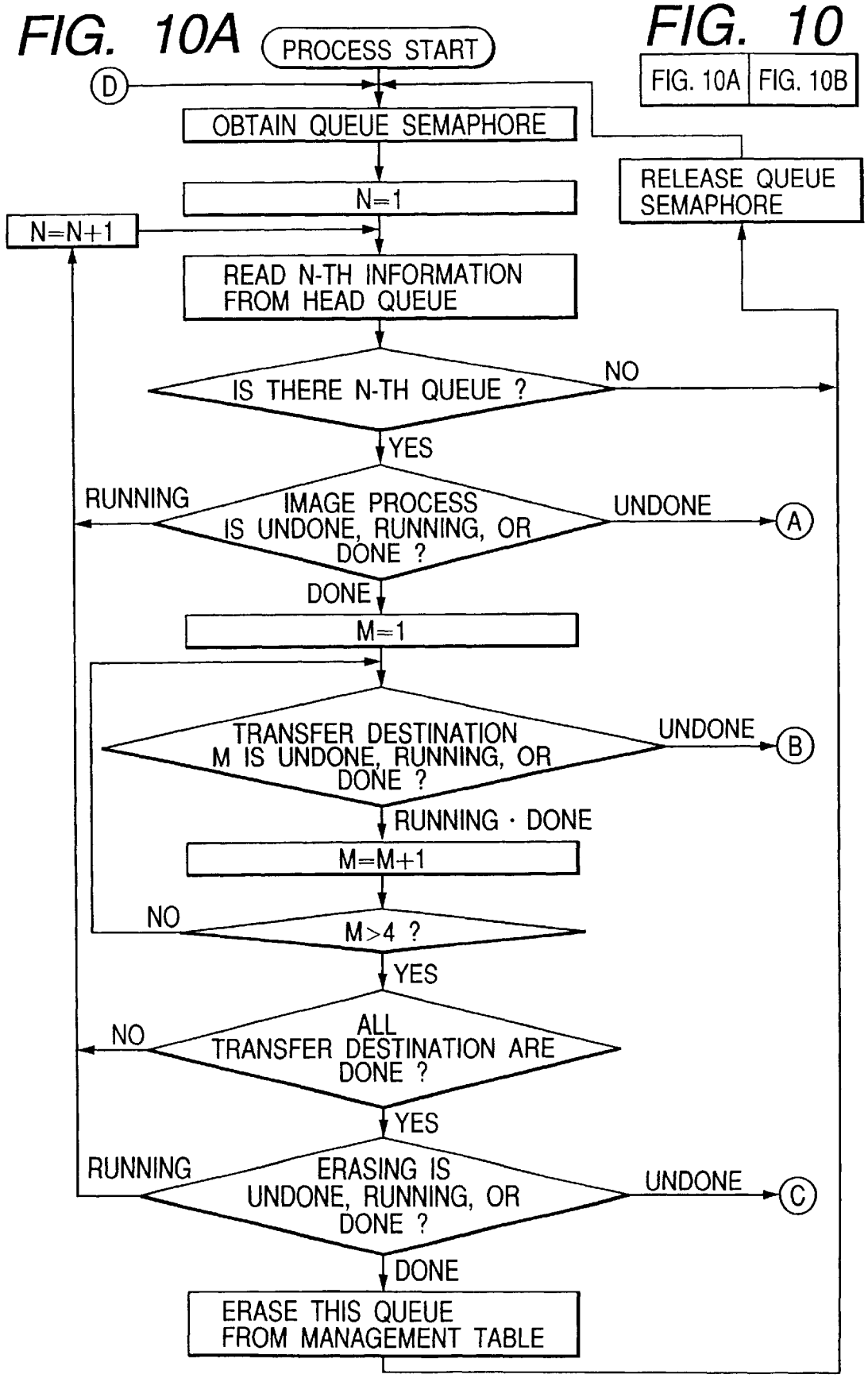

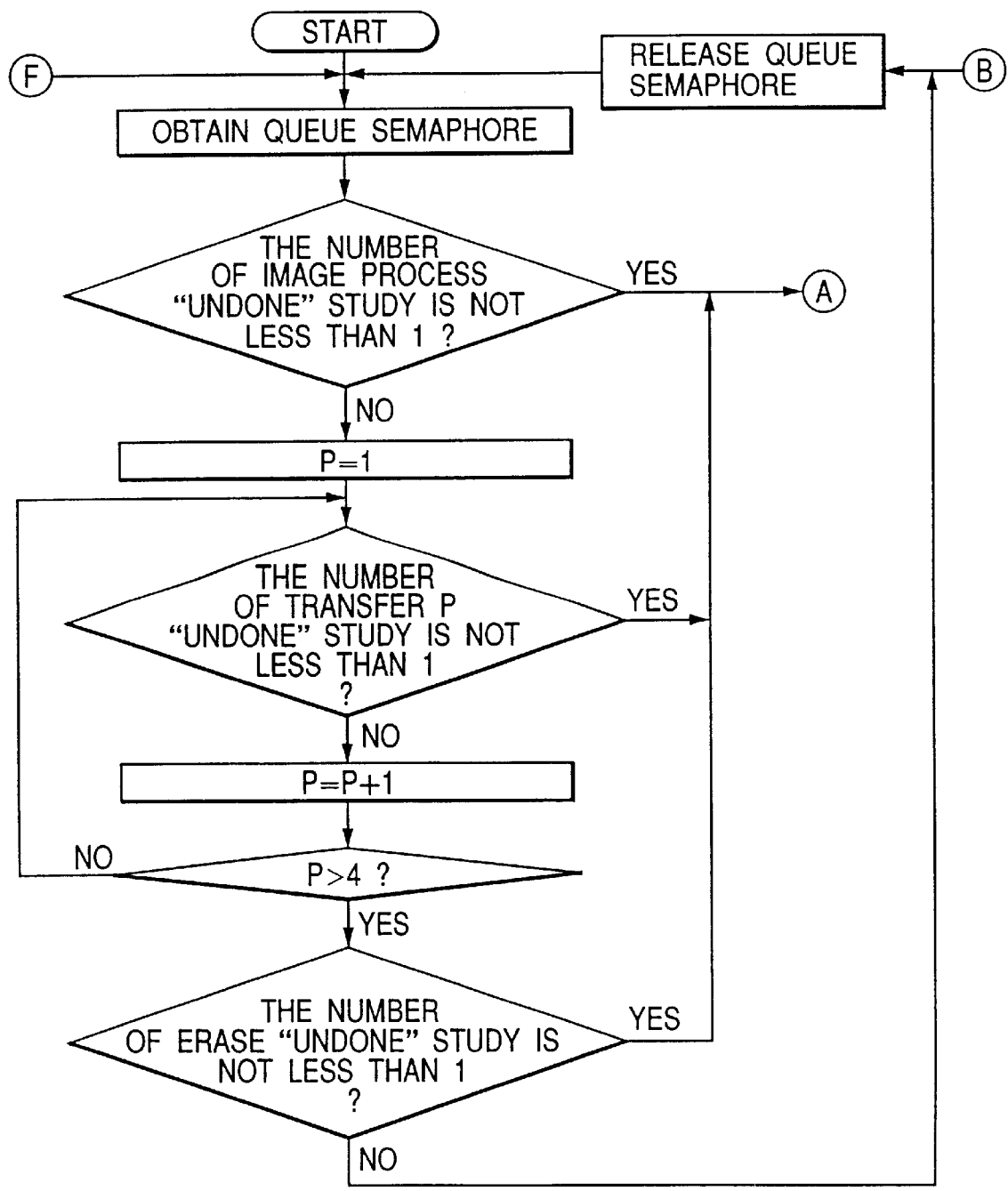

IMAGE PROCESS, IMAGE SENDING, IMAGE ERASING PROCESS 2

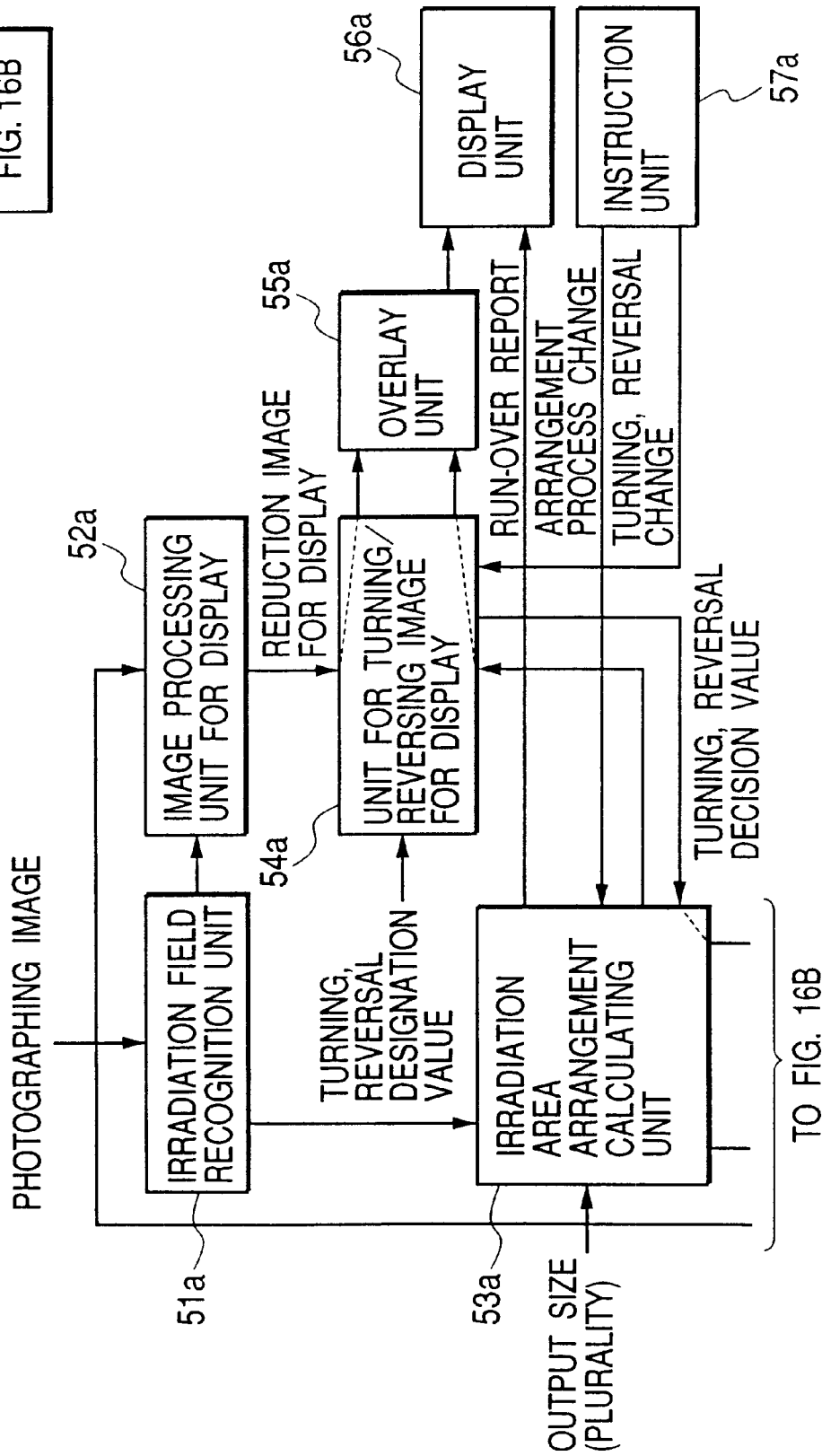

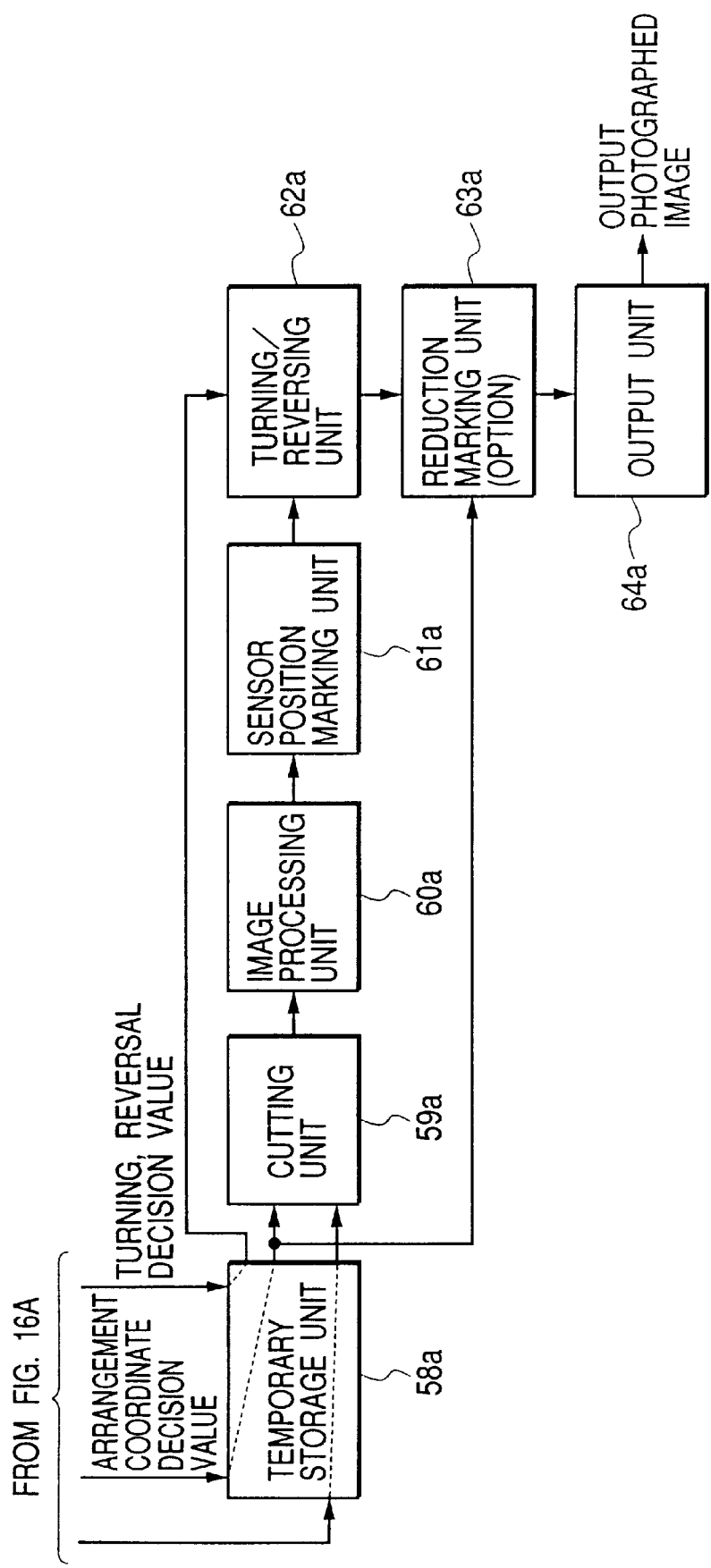

| INCH SIZE (cm) | APPELLATION | ARRANGEMENT CLASSIFICATION | THE NUMBER OF PIXEL | |
|---|---|---|---|---|
| 14×17 (35×43) | HALF SIZE VERTICAL SETTING | VERTICAL | 2048 | 2560 |
| 17×14 (43×35) | HALF SIZE HORIZONTAL SETTING | HORIZONTAL | 2560 | 2048 |
| 14×14 (35×35) | LARGE SQUARE SIZE | VERTICAL/ HORIZONTAL | 2048 | 2048 |
| 10×12 (24×30) | QUARTER SIZE VERTICAL SETTING | VERTICAL | 1768 | 1450 |
| 12×10 (30×24) | QUARTER SIZE HORIZONTAL SETTING | HORIZONTAL | 1450 | 1768 |

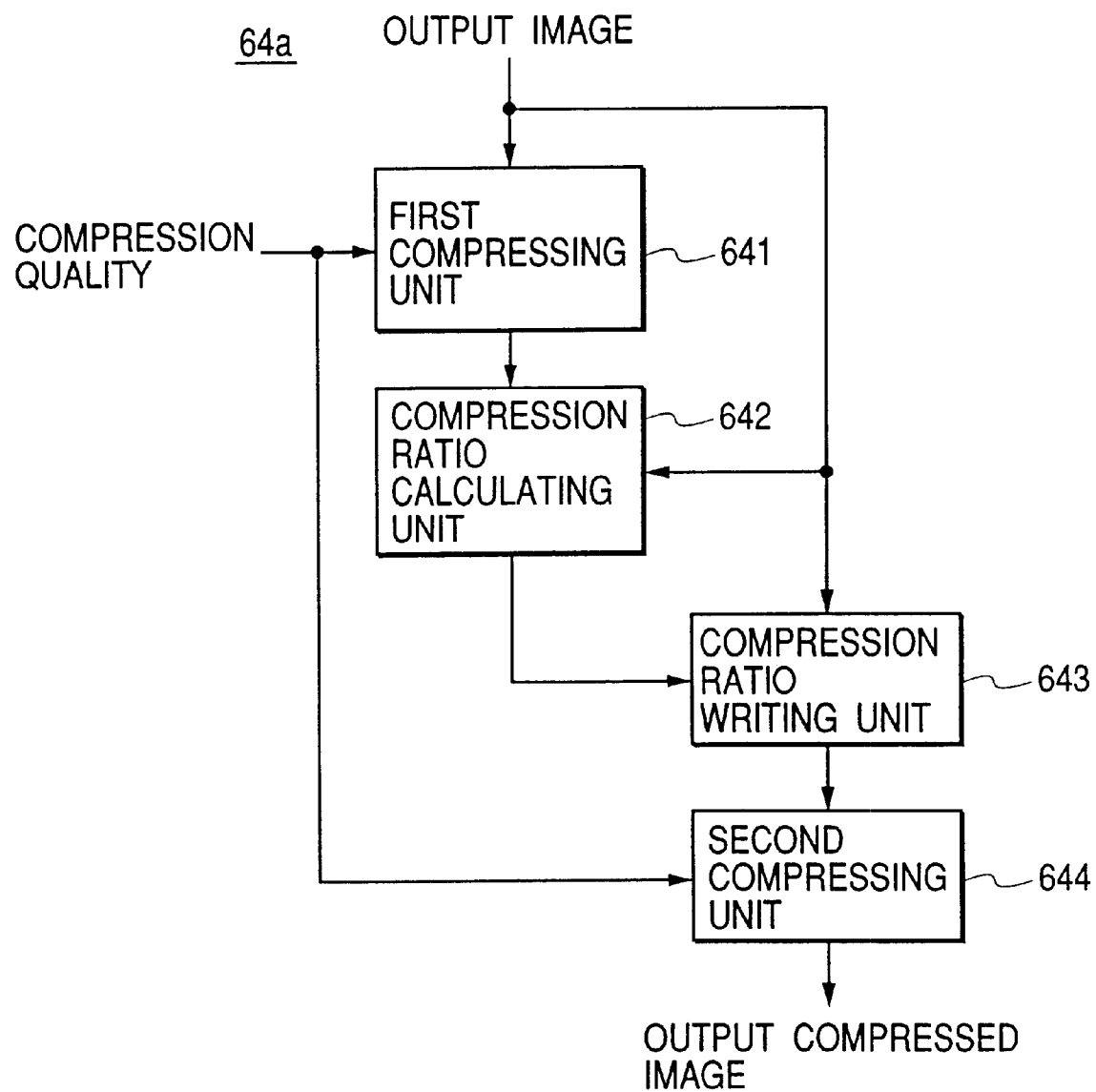

IMAGE PROCESSING APPARATUS AND METHOD AND COMPUTER-READABLE STORAGE MEDIUM

BACKGROUND OF THE INVENTION

1. Field of the Invention

The invention relates to image processing apparatus and method for performing a compressing process to an image and a storage medium which stores a program for such an image processing method.

2. Related Background Art

Hitherto, a film screen system comprising a combination of an intensifying screen and an X-ray photograph film is often used in X-ray photography for the purpose of a medical diagnosis. According to such a method, an X-ray passing through an object includes internal information of the object, it is converted into a visible light that is proportional to an intensity of the X-ray by the intensifying screen, and the X-ray photograph film is photosensed, thereby forming an X-ray image onto the film.

In recent years, the use of an X-ray digital photographing apparatus for converting an X-ray into a visible light that is proportional to an intensity of the X-ray by a fluorescent material, converting it into an electric signal by using a photoelectric converting element, and converting it into a digital signal by an A/D converter has been started.

In such an X-ray digital photographing apparatus, since the photographed image is a digital image, the collected images can be subjected to an image compression by a discrete cosine transformation that is typical as a JPEG compression or various image compressions by a wavelet transformation and the like.

According to an instruction of FDA of the Government of U.S.A., when the image compression is performed, rough compression ratios have to be embedded as a bit map in the collected images.

Since the compression ratio of the image compression generally fluctuates depending on the kind of image, however, a degree of the compression ratio cannot be known before the image compression is performed but can be known only after the image compression.

As mentioned above, hitherto, since the degree of the compression ratio of the image cannot be previously known, it is difficult to embed the information of the compression ratio into the compressed image.

SUMMARY OF THE INVENTION

The invention is made to solve the above problems and it is an object of the invention to obtain compression image data in which a compression ratio has been recorded.

To accomplish the above object, according to a preferred embodiment of the invention, there is provided an image processing apparatus comprising:

a first compressing unit for compressing by using an input image;

a calculating unit for calculating a compression ratio relative to the input image on the basis of a result of the compression by the first compressing unit;

an embedding unit for embedding information showing the calculated compression ratio into the input image; and a second compressing unit for compressing the input image in which the information showing the compression ratio has been embedded by the embedding unit.

Another object of the invention is to perform a control in consideration of a fluctuation of the compression ratio which is caused by embedding the information regarding the compression ratio into the compression image data when the compression image data is obtained.

To accomplish the above object, according to a preferred embodiment of the invention, there is provided an image processing apparatus comprising:

a first compressing unit for compressing an input image under a predetermined compressing condition;

a calculating unit for calculating a compression ratio relative to the input image on the basis of a result of the compression by the first compressing unit;

a changing unit for changing a value of the calculated compression ratio on the basis of a predetermined reference;

an embedding unit for embedding information showing the compression ratio changed by the changing unit into the input image; and a second compressing unit for compressing the input image in which the information has been embedded by the embedding unit under the predetermined compressing condition.

The above and other objects and features of the present invention will become apparent from the following detailed description and the appended claims with reference to the accompanying drawings.

BRIEF DESCRIPTION OF THE DRAWINGS

FIG. 5 is a constructional diagram showing default values of image processes, parameters for a natural reduction image process, and parameters for a natural image process;

FIG. 7 is a flowchart showing processes at the time of re-selection of the region setting button;

FIG. 8 is a constructional diagram showing a format of an inspection file;

FIG. 9 is a constructional diagram of a queue table;

FIG. 16 which is comprised of FIGS. 16A and 16B is a block diagram showing a construction of an image reading control unit;

FIG. 26 is a diagram showing a construction of an output unit to perform a compression ratio writing process according to the second embodiment;

DETAILED DESCRIPTION OF THE PREFERRED EMBODIMENTS

Preferred embodiments of the invention will now be sequentially explained hereinbelow.

First Embodiment

Figure 1:
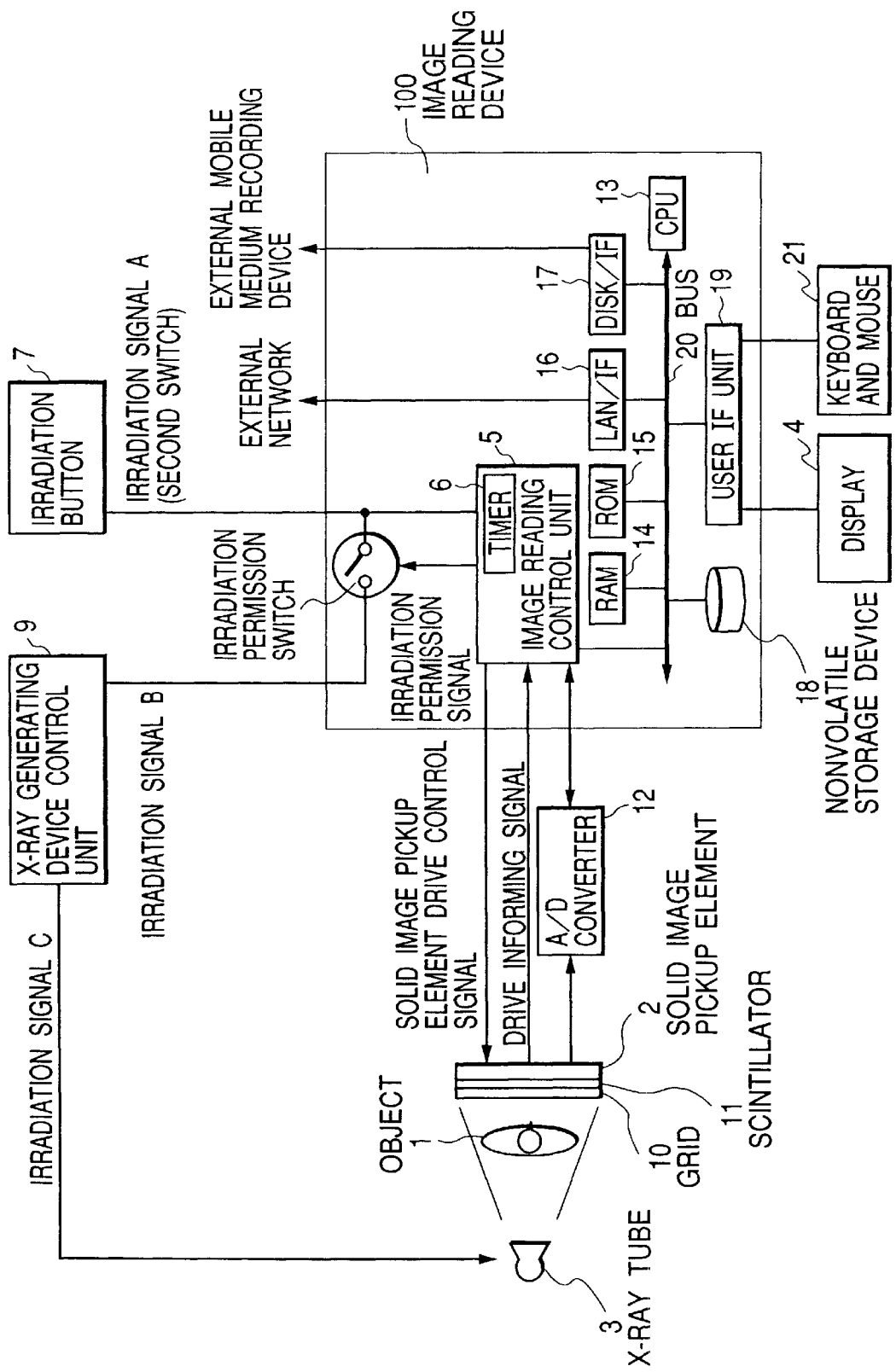
FIG. 1 is a constructional diagram of an X-ray image collecting apparatus according to an embodiment of the invention.

The following embodiment relates to the case of applying the invention to an X-ray image photographing apparatus. FIG. 1 shows a construction of an X-ray image collecting apparatus.

The operator arranges an object 1 to a position between a solid image pickup element 2 and an X-ray tube 3. The operator subsequently pushes a region setting button displayed on a display 4 in order to set a region to be photographed. By this operation, an image reading control unit 5 in an image reading device 100 applies a voltage to the solid image pickup element 2 by a solid image pickup element drive control signal, thereby preparing for an image input to the solid image pickup element 2 at any time. The control unit 5 starts an internal timer 6.

By subsequently pressing an irradiation button 7, an irradiation signal A is inputted to the image reading control unit 5. In response to it, the image reading control unit 5 confirms whether the solid image pickup element 2 is in a state where it can form an image when it receives an X-ray or not by checking a status of a drive informing signal from the solid image pickup element 2, and thereafter, generates an irradiation permission signal. Thus, an irradiation permission switch 8 is turned on, the irradiation signal A is inputted as an irradiation signal B to an X-ray generating device control unit 9. When the X-ray irradiation is prepared, the X-ray generating device control unit 9 soon generates an irradiation signal C, so that an X-ray is generated from the X-ray tube 3.

As for the irradiation signal A, a switch called a second switch is used.

The transmission ray of the X-ray which passed through the object 1 is inputted as an image to the solid image pickup element 2 through a grid 10 and a scintillator 11. This image is read out and converted into a digital signal by an A/D converter 12 and transferred to the image reading control unit 5.

The image reading control unit 5 is managed by a CPU 13. An RAM 14, an ROM 15, an LAN/IF 16, a DISK/IF 17, a nonvolatile storage device 18, a user I/F unit 19, and the like are connected to the CPU 13 through a bus 20. The display 4 and a keyboard and mouse 21 are connected to the user I/F unit 19, thereby performing an interface with the user. For example, a hard disk is used as a non-volatile storage device 18.

The image inputted to the image reading control unit 5 is once stored into the RAM 14 and subjected to various processes by the CPU 13.

Figure 2:
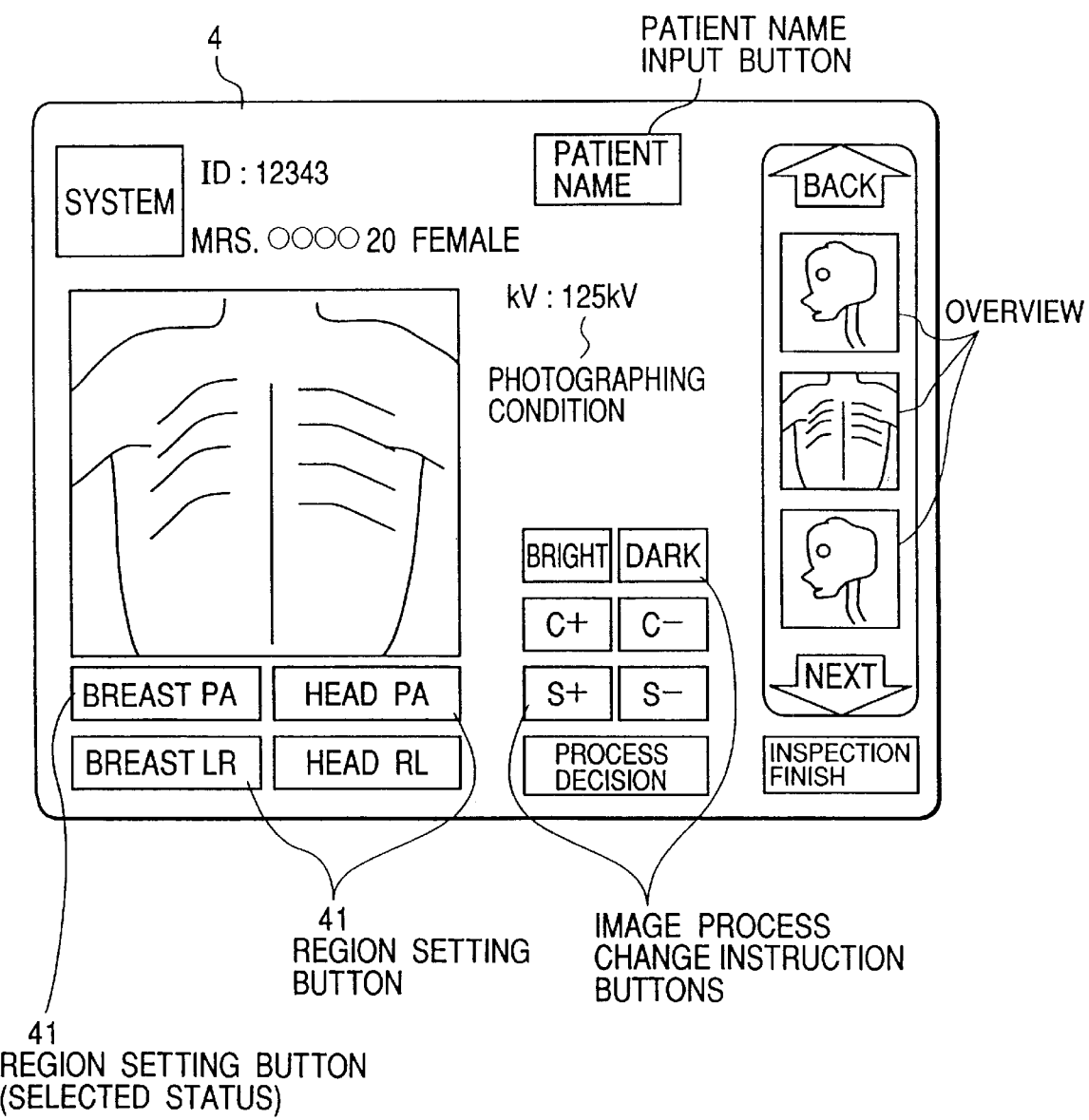
FIG. 2 is a constructional diagram of a display.

FIG. 2 shows a displaying state of the display 4.

When the photography is performed, the operator selects a region setting button 41 of a region to be photographed. The region setting button 41 is in a non-selected status before the photography is started. When the operator presses the button 41, it is set to a selected status. If the selected region setting button is wrong, re-selection can be performed by pressing another region setting button.

The region setting button 41 not only determines a default value of an image process parameter of the image process of the images collected by performing the photography but also sets a region name relative to the image and sets a tube of default. Further, by pressing the region setting button, the solid image pickup element 2 is set into a drive status by the solid image pickup element drive control signal in FIG. 1 and the timer 6 in the image reading control unit 5 is started.

Figure 3:
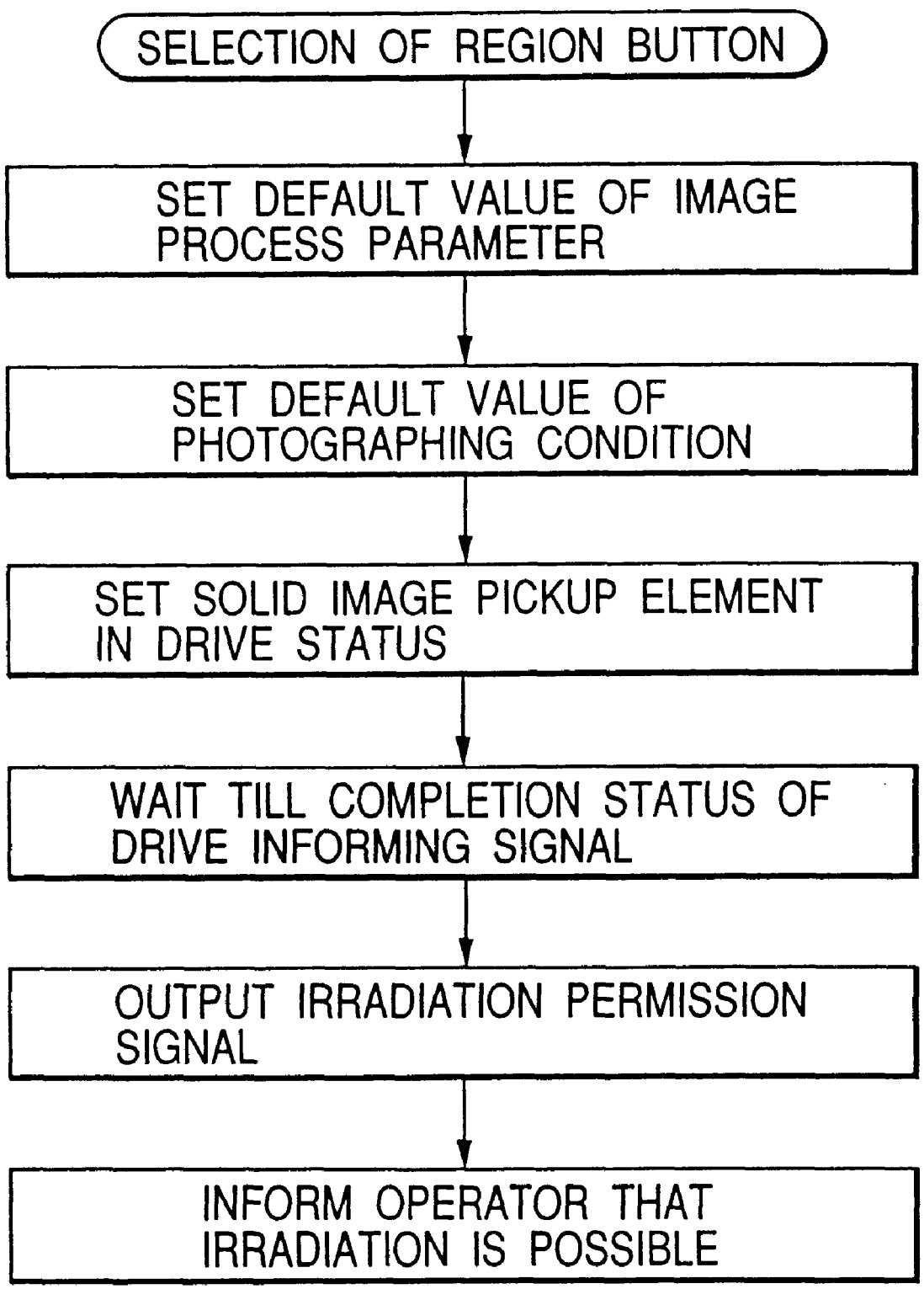
FIG. 3 is a flowchart showing processes by a selection of a region setting button.

FIG. 3 shows a flowchart for the above operation.

First, when the region setting button is selected and pressed, the solid image pickup element 2 enters a drive status. The solid image pickup element 2 waits until it enters a state where an image of a stable picture quality is outputted, and thereafter, sends the drive informing signal to the image reading control unit 5. In response to it, an irradiation permission signal is generated from the image reading control unit and the irradiation permission switch 8 is turned on, thereby enabling the second switch to be used.

After that, an irradiation possible state is notified to the operator by the display 4 through the user I/F unit 19. The above notification is performed by, for example, changing a background color in the display 4 from blue to green.

The operation of the timer 6 will now be described.

Each time the user presses the region setting button, the timer 6 starts the counting operation from "0". After the elapse of a predetermined time, for example, 10 minutes, it is notified to the image reading control unit 5. Thus, the image reading control unit 5 resets the drive status of the solid image pickup element 2, resets the irradiation permission signal, opens the irradiation permission switch 8, and further notifies the CPU 13 of a fact that the X-ray generating device cannot photograph.

When a message indicating that the X-ray generating device cannot photograph is notified, the CPU 13 sets the selected status of the region setting button selected by the operator into a non-selected status and, further, notifies the operator of a fact that the irradiation became impossible by the display 4. For example, the background color in the display 4 is returned from green to blue in a manner opposite to that mentioned above.

With the above method, a state where the solid image pickup element 2 is always in the drive status is prevented and the deterioration of the solid image pickup element can be prevented.

The operator needs to input patient information such as a patient name and the like. When a patient name input button is clicked by the mouse, a patient information input window appears. Therefore, a patient name, a patient ID, a birthday, an age, and the like are inputted there by using the mouse and keyboard. If the patient is being photographed, the patient information can be inputted before a region is selected or after it was selected or after the images were collected. That is, there is no need to designate the inputting order of the patient information so long as the input timing is a timing before an inspection end button to finish an inspection comprising a plurality of photographing operations regarding the patient is pressed. Therefore, even in a case where an enough time to input the patient name and the like is not assured or the like in the photography of a patient whose condition is bad or the like, the image photography can be precedingly performed.

Figure 4:
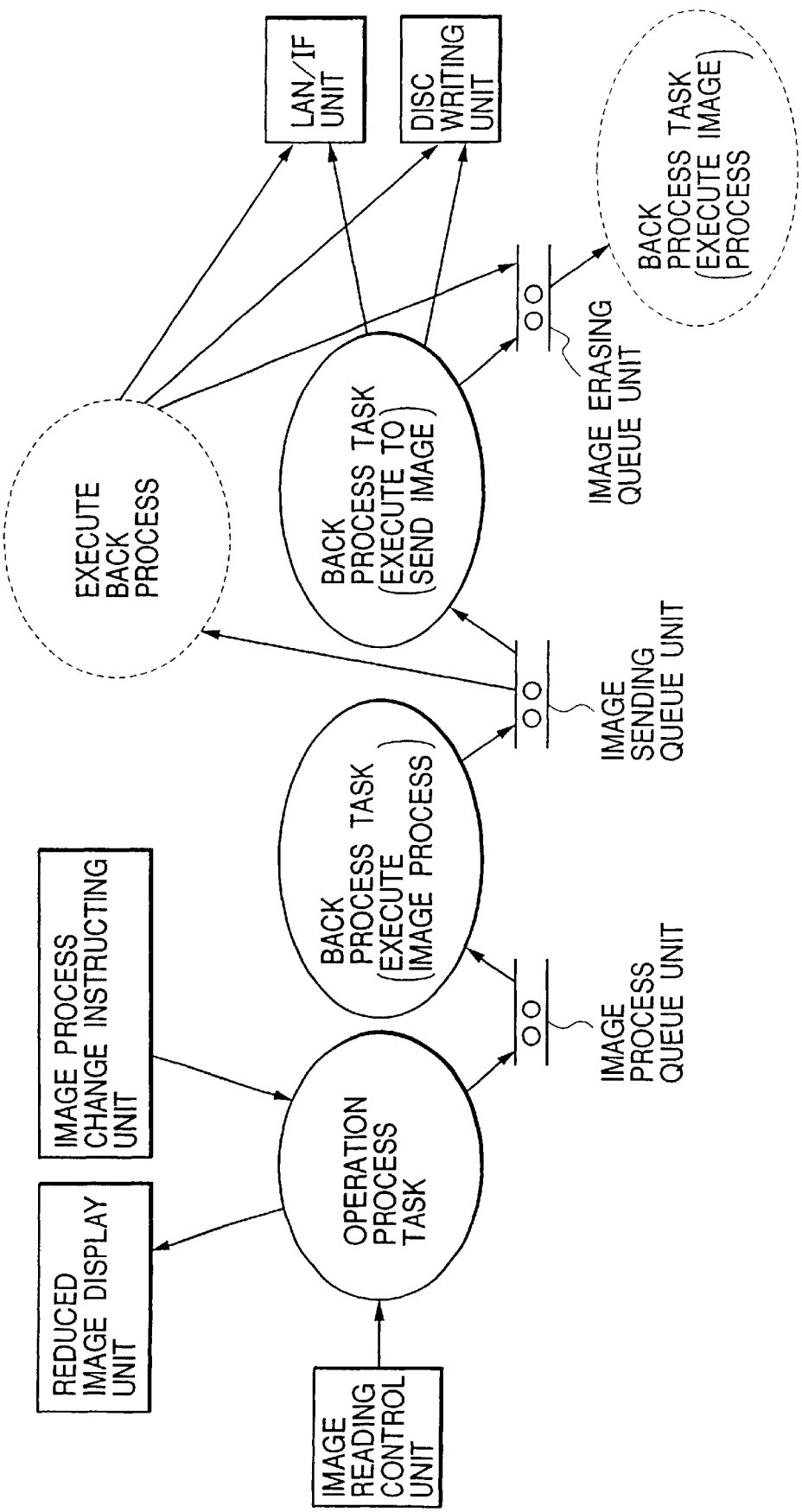
FIG. 4 is a constructional diagram of tasks of an image reading device.

FIG. 4 is a task constructional diagram of the image reading device 100. The operation after the image collection will now be described with reference to FIG. 4.

A task construction will be first described. In the CPU 13 of the image reading device 100, a plurality of tasks time-divisionally operate in parallel. An operation process task is a task for mainly performing processes based on the operation by the user. A back process task is a task for performing an image process of the collected images as necessary, transferring the processed images via a network or transferring them to the outside such as a mobile disk of a large capacity, or erasing the transferred image. When they are transferred to the outside, the images are subjected to a non-reversible compression, for example, a DCT compression of JPEG by using predetermined non-reversible compressing coefficients and transferred. The non-reversible compressing process is also performed by the back process task.

Although four tasks including a circle shown by a broken line are described in FIG. 4 for convenience of explanation, it is one of features that the above four or more operations are executed by four or less tasks. FIG. 4 shows an example in which a plurality of (four or more) operations are executed by two tasks. Therefore, two circles are shown by broken lines. The number of tasks which operate fluctuates in dependence on a case where the photography is being performed and a case where it is not performed. When the operator starts to photograph, although there are two activated tasks, if the next photography is not performed for one minute after he end of the photography, the number of tasks is increased to 3. Such a time-out time can be separately set by a setting panel.

When the photography is started, the number of activated tasks is reduced to 2. As for the timing to reduce the number of tasks, the task reducing process is not performed while the task process is being executed but the number of tasks is reduced at the time of completion of the task process. Thus, since the number of tasks to be activated decreases by the start of the photography, a background process can be executed without becoming an obstacle of the photographing operation.

An image process queue unit is provided between the operation process task and the task which is executing the image processes, thereby providing a nonvolatile first-in first-out mechanism to process the images generated by the photography. An image sending queue unit is provided between the task which is executing the image processes and a task which is executing the image sending, thereby providing a nonvolatile first-in first-out mechanism to send the images in which the image processes were finished by the image process task. Further, an image erasing queue unit is provided between the task which is executing the image sending and a task which is executing an image erasure, thereby providing a nonvolatile first-in first-out mechanism to erase the images which were completely sent.

The image processes which need a relatively long time and the image sending task can be performed in parallel by those nonvolatile first-in first-out mechanisms. Thus, the operation process task in which a high response speed is required can smoothly perform the operation and, even if the system is finished during the execution of the image processes, image sending, and the like, the images will not be lost.

Referring again to FIG. 1, after the region setting button was pressed, when the operator presses the irradiation button 7 within a predetermined time, for example, 10 minutes set by the timer 6 and irradiates, the images photographed by the solid image pickup element 2 are inputted to the image reading control unit 5 through the A/D converter 12. In the image reading control unit 5, a correcting process which can be accomplished by hardware among the image processes is executed. After that, the images are transferred onto the RAM 14 from the image reading control unit 5. This image transfer is performed by a DMA transfer between the image reading control unit 5 and RAM 14 and processed at a high speed because the image signal does not transmit through the CPU 13. The image is a square image comprising 2688 pixels in the horizontal direction and 2688 pixels in the vertical direction. Each pixel has gradations of 12 bits. Such an image is hereinbelow called a natural image.

The operation process task reduces the collected images after they were collected. Such an image is hereinafter called a natural reduction image. A size of such an image is equal to 336×336×12 bits. A subsampling process is performed upon reduction. Subsequently, the operation process task immediately saves the natural image into the nonvolatile storage device 18. The operation process task subsequently obtains a natural reduction image process parameter from a value set in the natural reduction image by a default per pre-selected region in accordance with a rule, which will be explained hereinlater, starts image processes on the basis of the parameter, and displays a processing result by a monitor.

In the embodiment, processes such as irradiation field recognition, image emphasis, and gradation conversion are executed in order as image processes. All of the image processes are executed at a gray scale of 4096 gradations. Finally, the processed image is written into a display area of 336×336×8 bits and displayed on the display. When the image is displayed on the monitor, since the user I/F unit 19 has a table to gamma correct the display 4, the linearity of the display is corrected.

FIG. 5 shows the details of parameter values in the image processes. The default values of the above three process contents have been predetermined as default values in accordance with each region to be photographed. The irradiation field recognition is a routine to extract an irradiation field area of the image and is used as a density determination parameter at the time of gradation conversion. It is also used as cutting information to cut out and transfer only the necessary image portion at the time of network transfer. If a setting parameter of the irradiation field recognition indicates "automatic", the irradiation field is automatically recognized for the natural reduction image. Since a size of natural reduction image is equal to ⅛ of the natural image, when a natural image process is performed, it is necessary to increase a width and a height of the cutting area and cutting start position information by eight times.

The user can designate the irradiation field area by the operation to click two upper left and lower right positions of the irradiation field on the reduction image displayed on the display by using the mouse. In this case as well, it is likewise necessary to increase a width and a height of the cutting area and cutting start position information by eight times.

The irradiation field area can be designated by a predetermined area without recognizing the irradiation field area. In this case, although the cutting area position information has been inputted as default values, the natural reduction image has to reduce all of those values into ⅛ and use them.

The image emphasis is a frequency emphasis of the image. Its parameter value is divided into four stages of 0 to 30 and default values have been predetermined depending on the region to be photographed. When the image emphasizing process is performed for the natural reduction image by using the default values, there is a tendency such that the image process is excessively visually emphasized and seen as compared with the case where a similar image emphasizing process by the same parameter is performed to the natural image. However, since the image size ratio is equal to ⅛, even if it is sufficient to also reduce the image emphasis parameter into ⅛, whether the image has been processed or not cannot be known. Therefore, if the process is performed by experience to the natural reduction image by using the value of the magnitude of ½ to be set as an image process parameter into the natural image, an image that is visually almost equivalent to that obtained by the image process performed to the natural image can be seen.

The operator can change the image emphasis parameter by clicking "S+" and "S−" buttons in FIG. 2 by the mouse. However, as for the image process parameter decided by the operator, a double value is used as a parameter for a natural image process.

In the gradation conversion, its parameter is automatically determined by using the area of a result of the irradiation field recognition. The value determined for the natural reduction image is also used as the same value for the natural image. As mentioned above, the operation process task obtains the natural reduction image process parameter in accordance with the predetermined rule from the value set as a default into the natural reduction image per region which has previously been selected. In this case, all such rules are not always set to ⅛.

When the image processes are decided, a process decision button shown in FIG. 2 is pressed. The region setting button for next photography is selected by the mouse. After completion of the photography regarding the patient, the end of inspection is selected by the mouse. On the basis of any of the above operations, the image reading control unit 5 performs a non-reversible compression to the reduction image for display of 336×336×8 bits which has already been described above by using a non-reversible compressing coefficient which has been predetermined every region. Its compression ratio is calculated by a ratio between a byte size of the original image and a byte size after the compression.

The reason why the non-reversible compressing coefficient needs to be different every region is to hold an image that is sufficient for diagnosis even if an image is highly compressed in case of a bone image of orthopedics while a relatively high fine image is needed in, for example, a breast. The compression ratio calculated at this time is held together with an image attribution and used for processes at a post stage.

In the embodiment, after the input image was reduced, it is once compressed and the compression ratio is calculated. However, the invention is not limited to this method but it is also possible to compress the input image as it is, calculate a compression ratio, and record the calculated compression ratio into the input image.

As described above, although the photography can be sequentially performed in the inspection of one patient, patient information has to be inputted before executing an inspection finish button to finish all of the photographing operations. If it is not inputted by a patient name input button, by pressing the inspection finish button, a patient name input window is automatically opened and the patient name can be inputted from the patient name input window. Further, if all of the information was inputted to the patient name input window and the completion of the input is instructed, the inspection is automatically finished. A series of images handled by the inspection is inputted as one queue into an image process queue.

In the embodiment, as shown in FIG. 2, the images which have already been photographed are arranged as reduction images onto an overview picture plane. By selecting the overview picture plane by the mouse, the already photographed images can be again displayed as images. The above operation is accomplished by a method whereby the natural images which have already been stored in the nonvolatile storage device and concerned with the selected overview image are again arranged on the RAM and, thereafter, the same operation as the ordinary photography is performed by the operation process task in a manner as already described above.

Figure 6:
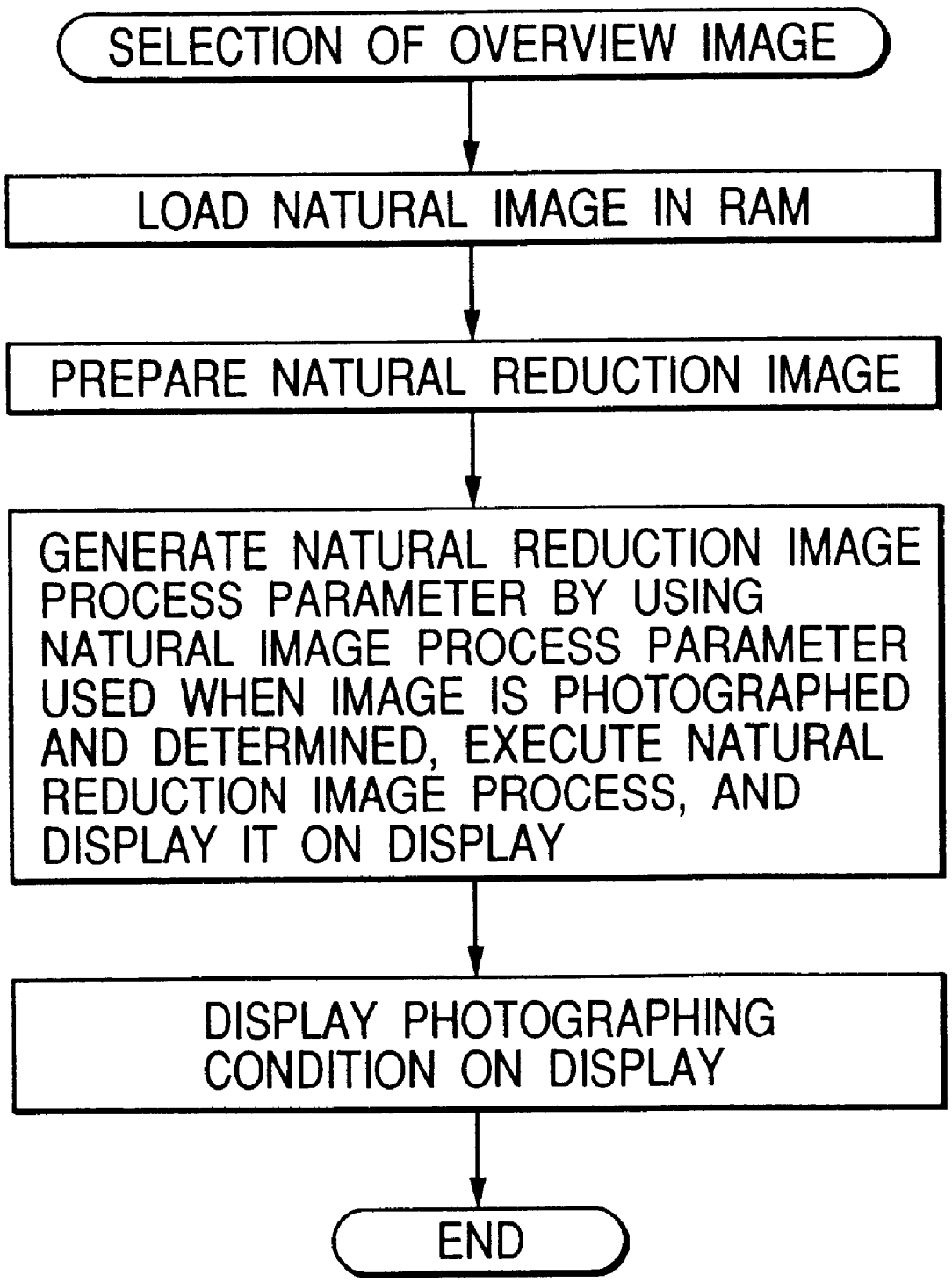
FIG. 6 is a flowchart showing processes at the time of selection of an overview image.

FIG. 6 shows a flowchart for processes when the operator selects the overview image. First, the natural image is loaded onto the RAM. A natural reduction image is subsequently formed. Then, a natural image process parameter when the image is photographed and the operator decides an image processing condition is used as a default value shown in FIG. 5 and converted into a parameter for natural reduction image process in accordance with the rule in FIG. 5. The natural reduction image process is performed by using such a parameter and it is again displayed on the display. Finally, the photographing condition is displayed on the display.

It is a feature in this case that after the natural images stored in the nonvolatile storage device were again stored onto the RAM, by again selecting the region setting button, the photographed image can be handled as a photograph in a different region. That is even if the operator erroneously selects a different region setting button and collects images, by again processing various attribution information and image processing as a different region in the post-processes, it can be changed to the different region.

FIG. 7 shows a flowchart for the processes in this case. When the region setting button is pressed after the already photographed image was displayed on the display by the overview image selection, if the operator selects an OK button after a warning display indicating that the region change is performed was issued, the natural reduction image is generated by using a natural image process default parameter relative to such a region, the natural reduction image process is performed, and it is displayed on the display. As for the photographing condition, a preset value of such a region is displayed on the display. In this instance, obviously, the operator can again change the image process in a manner similar to the ordinary photography.

Although there has already been mentioned that the inspection finish button is selected to finish the inspection comprising one or a plurality of photographed images, at this time, as already described in FIG. 4, all of the post-processes of the inspection in the system are executed in a background by multitask processes and the operator can again immediately shift to the next photography.

FIG. 8 shows a format of an inspection file which is formed at the end of inspection. When the inspection finish button is selected, one inspection file is formed. The inspection file comprises one inspection attribution and a plurality of image attributions. As for the inspection attribution, a patient attribution, an inspection specific attribution, and the number of photographed images are written. The patient attribution includes a patient ID, a patient name, a birthday, sex, and the like. The inspection specific attribution includes an inspection ID, an inspection date, an inspection time, and the like. The number of photographed images is the total number of image attributions written in the inspection file. The image attribution includes a region name, a photographing condition, a natural image processing condition, a non-reversible compression ratio, and a natural image file name.

The region name is a name of the photographed region. A tube voltage, a tube current, and the like are written under the photographing condition. As a natural image processing condition, the parameter for natural image process is shown in FIG. 5. The non-reversible compressing coefficient and non-reversible compression ratio have already been described. As already described, when the image is collected, in the case where the natural image collected from the image reading control unit is stored into the non-volatile storage device, the natural image file name indicates its file name. Since the inspection file includes all of the inspection information and the link information to the image file, by managing the inspection file name by the nonvolatile queue, the system shown in the embodiment is constructed.

Returning to FIG. 4, although the operations such as image process, image sending, image erasure, and the like are executed in the background, the data is handed for such a period of time by the image processing queue, image sending queue, and image erasing queue. It is one of the features of the embodiment that the image processing queue, image sending queue, and image erasing queue are managed in one table. It is called a queue table hereinbelow.

FIG. 9 shows the details of the queue table. When one inspection in which the photography of one patient is constructed by a plurality of images is stored as an inspection file into the nonvolatile storage device and inputted into the image process queue unit shown in FIG. 4, a new QID is issued onto the queue table and one line is added to the last line. In the queue table, since a plurality of back process tasks and a single operation process task rewrite it, an excluding process called a semaphore process is performed. The queue table has to be constructed such that the other task does not write during the writing operation of the queue table. It is assumed hereinbelow that the operation to obtain an authority to write into the queue table is called "obtain a queue semaphore" and the operation to cancel the authority to write into the queue table is called "release a queue semaphore".

Figure 13:
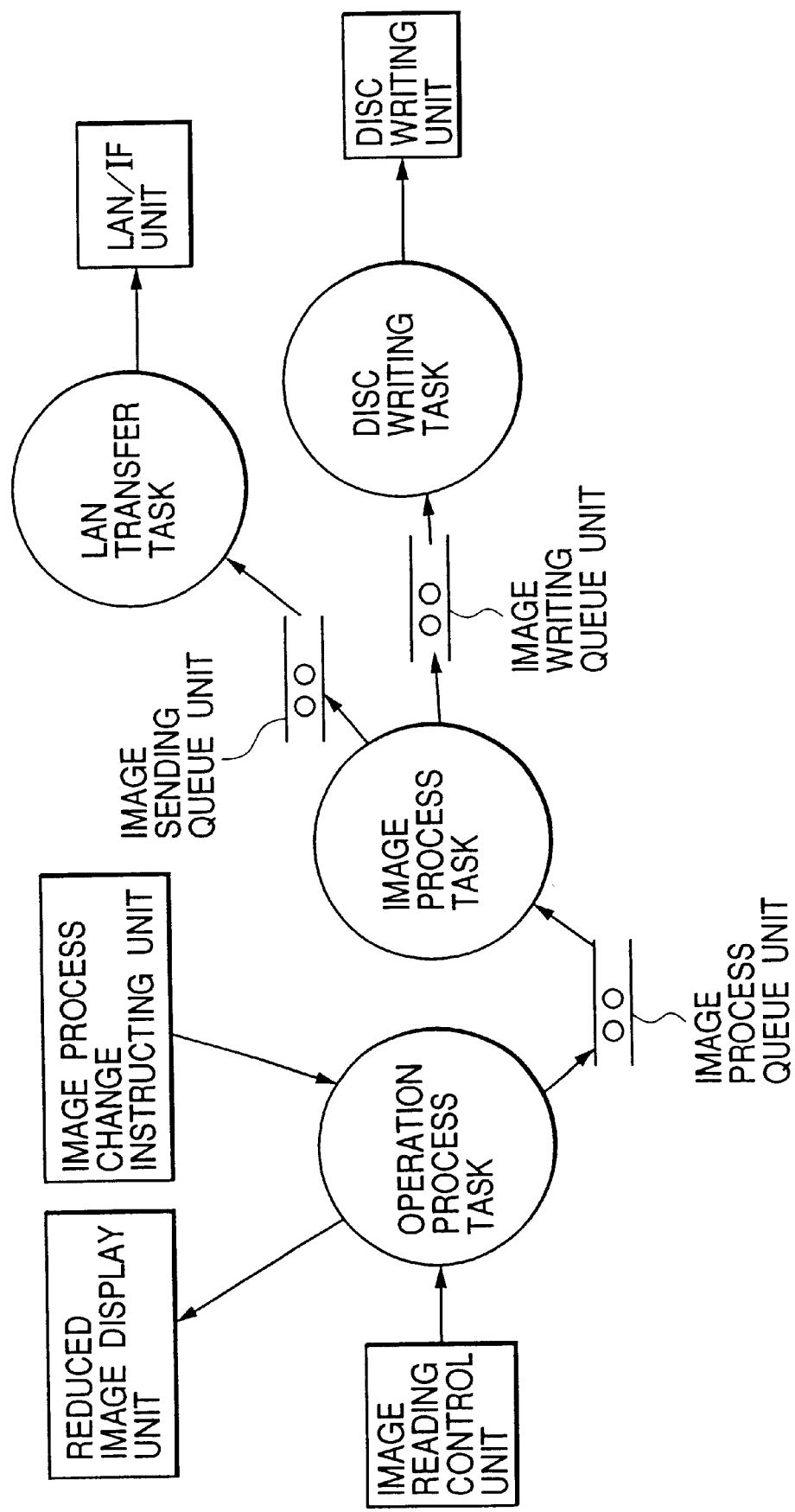
FIG. 13 is a constructional diagram showing a conventional example of a queue management.

FIG. 13 shows a conventional management of the queue table and shows that if a plurality of queue tables exist, the queue table exists like an image process queue, an image sending queue, and an image erasing queue every processing apparatus.

Figure 12:
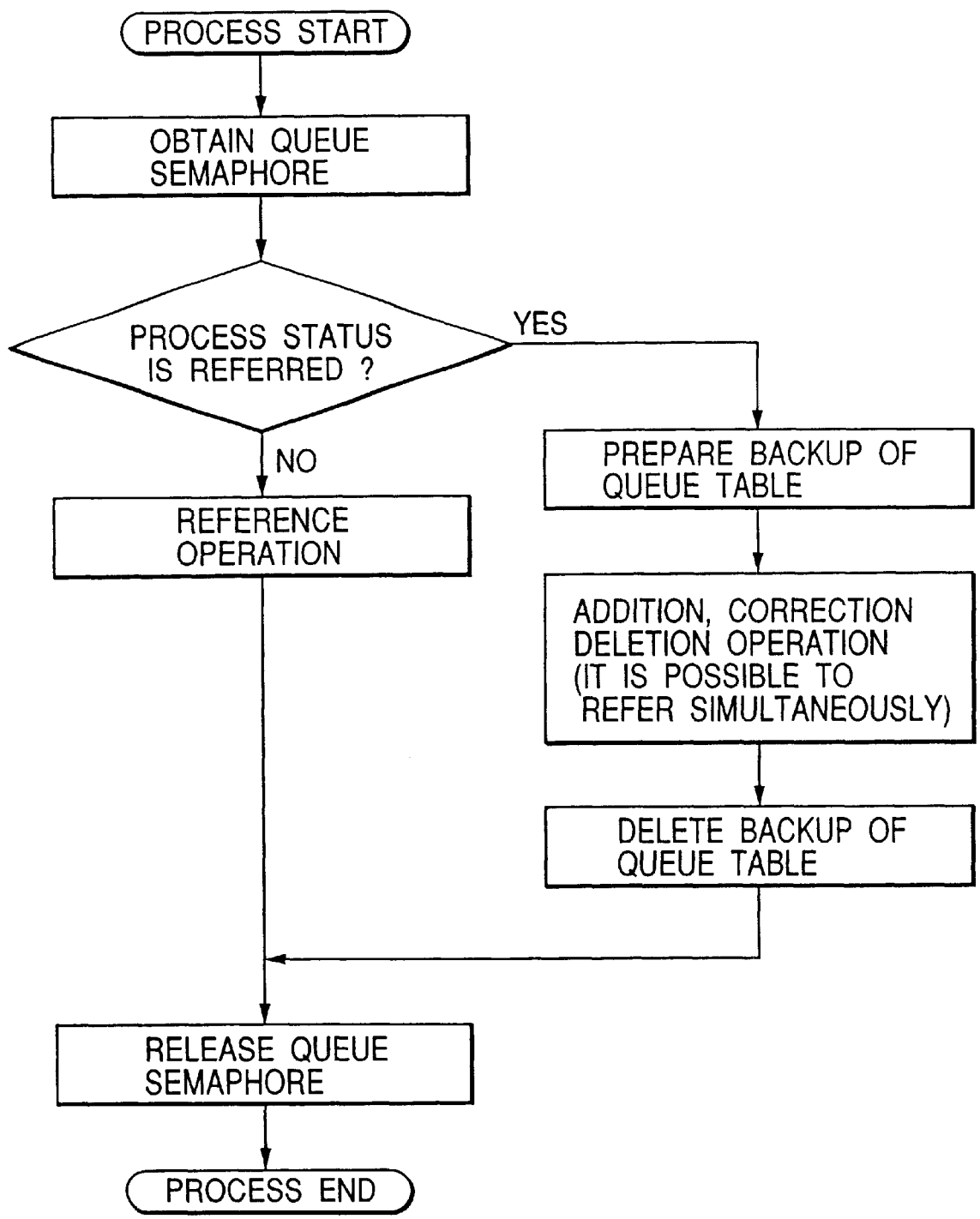
FIG. 12 is a flowchart showing processes for reference, addition, correction, and deletion to the queue table.

FIG. 12 shows a flowchart for the processes to refer to, add, correct, and delete a process status in the inspection file in the queue table.

When referring to the queue table, a queue semaphore is obtained, the operation to refer to the table is performed, and the queue semaphore is released.

When the queue table is added, corrected, or deleted, by obtaining the queue semaphore and copying a backup table of the queue table, it is formed and the operation to add, correct, or delete the table is performed. In this instance, two or more of the adding, correcting, and deleting operations can be performed in a lump and the operation to refer to the queue table can be also performed. After the copy of the backup table of the queue table was deleted, the queue semaphore is released. When the inspection file is added to the queue, after the queue semaphore was obtained, a new QID is issued onto the queue table, one line is added to the last line, and thereafter, the queue semaphore is released.

The queue table will now be described. For simplicity of explanation, although the process statuses are now represented by words of "undone", "running", and "done", the values of $-1$, $-2$, and $-3$ are actually used. Each column shows a process which has to be performed in the background. In the image process, the natural image described above is processed by the natural image process parameter. Each of transfer 1 to transfer 4 indicates a process to transfer the processed natural image to an external apparatus. The external apparatus indicates an external mobile medium recording device directly connected by a server apparatus, a printer, an SCSI, or the like connected to the network. The erasure indicates a process to erase images such as natural images in which all of them were completely transferred, images after the image processes, or the like, namely, the images which have been stored on a hard disk and are concerned with the queue. Each line of the queue table is called a queue hereinbelow.

When the inspection file is inputted into the image process queue unit, "undone" showing that the process is not performed yet is written with respect to the columns of the "image process", "transfer 1" to "transfer 4", and "erase". "undone" denotes that any back process task does not perform the operation shown by this column. "running" denotes that one back process task is executing the operation shown by its column. In this instance, the task ID (TID) indicative of the back process task is also simultaneously written in the queue table. "done" denotes that the operation shown by its column has been finished.

Figure 10B:
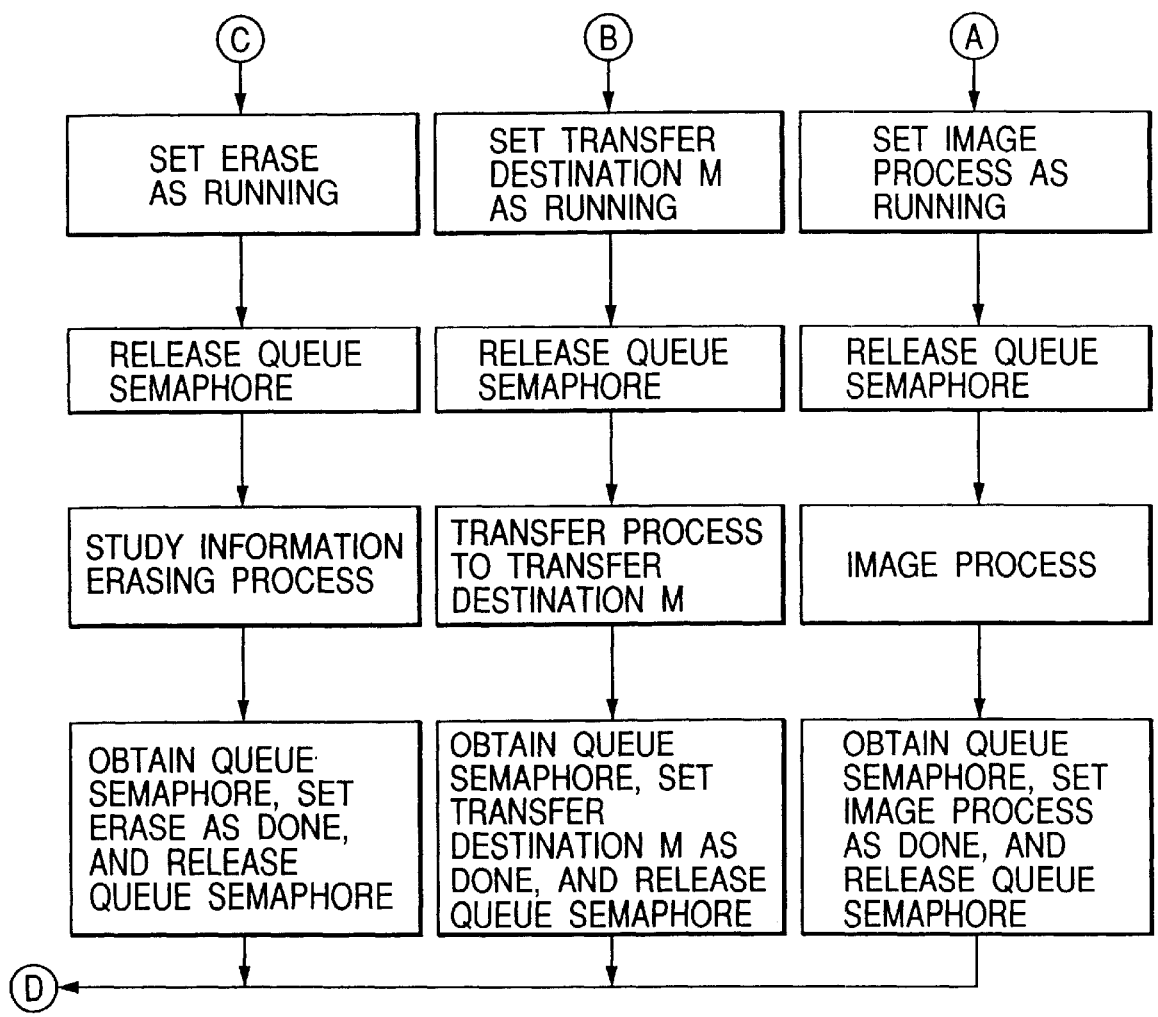
FIG. 10 which is comprised of FIGS. 10A and 10B is a flowchart showing an image process, image sending, and an image erasing process.

FIGS. 10A and 10B show how the back process task having a plurality of same control methods synchronously executes processes with reference to the queue table in which "undone", "running", and "done" have been written.

When the back process task starts the execution, it has to refer to the queue table. In the queue table, since a plurality of back process tasks and a single operation process task rewrite it, the excluding process called a semaphore process is performed.

First, when the back process task starts the execution, the queue semaphore is obtained. When the queue semaphore cannot be obtained, the control does not advance at this time point but enters a waiting state until the task of the third party releases the queue semaphore.

A counter N to start to read out the N-th queue from the head in the queue table is set to "1". Subsequently, the N-th information is read out from the head queue.

When the N-th queue exists, the processing routine advances to the next step. However, if the N-th queue does not exist, the queue semaphore is released and the apparatus waits until the queue semaphore is obtained and, thereafter, the processing routine is returned to the first step. If the N-th queue exists, the content of the image process column is confirmed. If it is "undone", the image process column in the N-th queue is set to "running" and the task ID of the back process task which is being executed is written. The queue semaphore is released.

The inspection file written in the N-th queue is read out and the image processes are performed to the images which the inspection file has. There are features in this instance that the image processes are performed on the basis of the natural image process parameter which has already been described and, after the non-reversible compression ratio of the image recorded in the image attribution was embedded as a bit map into the image, the processes up to the image compression are performed. That is, the image processes here indicate the processes up to the image compressing step.

Figure 14:
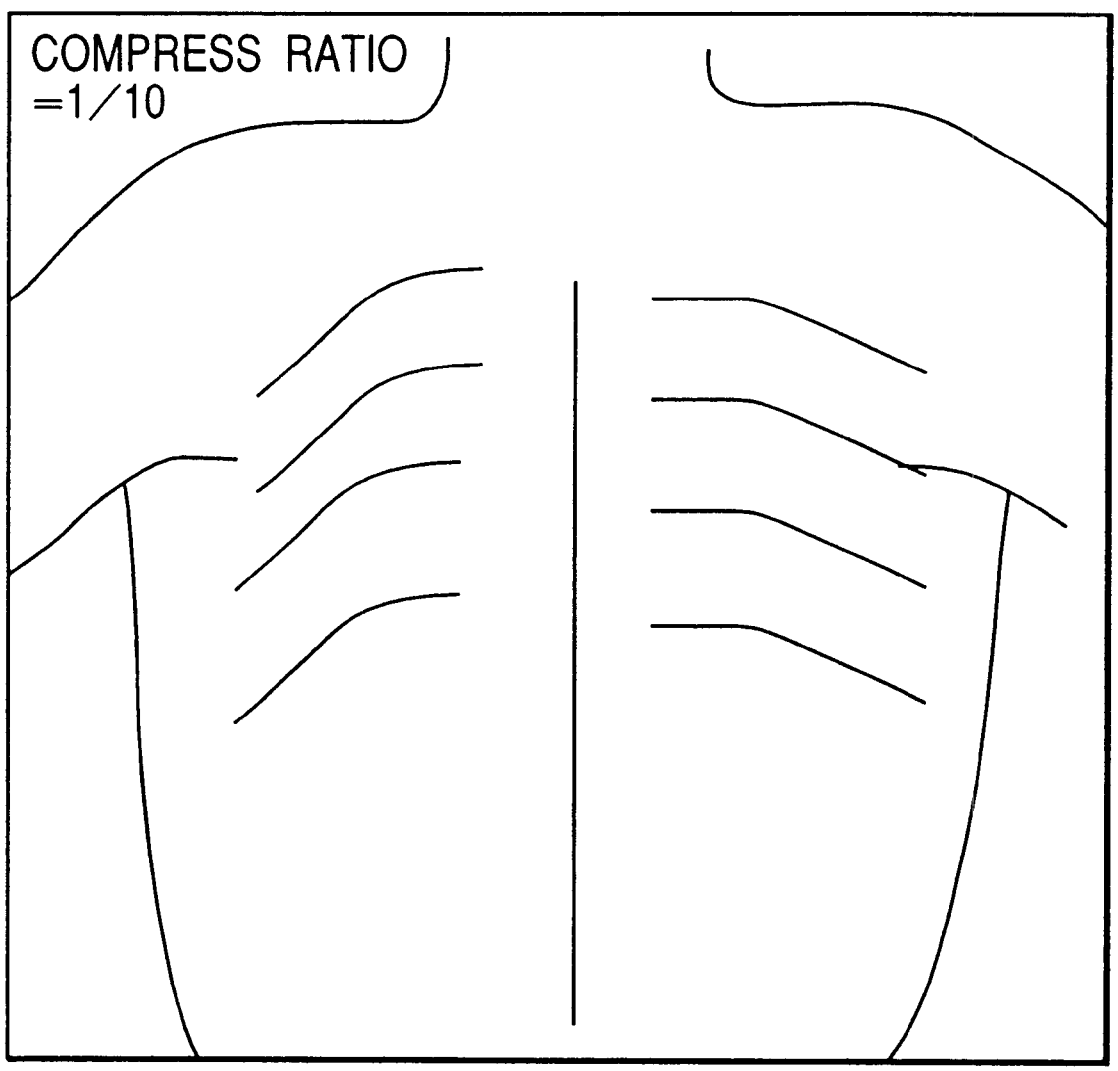
FIG. 14 is a constructional diagram showing an example of an image in which a compression ratio has been embedded as a bit map.

FIG. 14 shows an example of an image in which the compression ratio of the image has been embedded as a bit map. When the image processes are finished, the queue semaphore is again obtained, the content "running" is changed to "done", and the queue semaphore is released. The processing routine is returned to the first step. At this point, since the semaphore is released while the image processes are being performed, as for the back process task and operation process task other than the back process task which is performing the image processes, it is important that the queue semaphore can be obtained for the purpose of performing some operation.

Subsequently, when the image process column is "running", the counter N is increased by "1" and the processing routine is returned to the position shown in FIG. 10A. When the image process column is "done", a transfer counter M is set to "1" in order to perform the transferring operations from "transfer 1" to "transfer 4". Subsequently, the content of the column of the transfer M is checked. If it is "undone", the column of the transfer M in the N-th queue is changed to "running" and the task ID of the back process task which is being executed is written. The queue semaphore is released.

The inspection file written in the N-th queue is subsequently read out and the transferring process of the transfer M is performed to the image which the inspection file has. The transfer M is an operation to transfer the image to a transfer destination which has been preset in the system. When the transferring process is finished, the queue semaphore is again obtained, the content "running" is changed to "done", and the queue semaphore is released. The processing routine is returned to the first step. At this point, since the semaphore is released while the transferring process is being performed, as for the back process task and operation process task other than the back process task which is performing the transferring process, it is important that the queue semaphore can be obtained for the purpose of performing some operation.

Subsequently, when the transfer process column is "running" and "done", the counter M is increased by "1". When the count value of the counter M does not exceed "4", the processing routine is returned to the position shown in FIG. 10A. Thus, all of "transfer 1" to "transfer 4" are inspected.

When the count value of the counter M exceeds "4", whether all of "transfer 1" to "transfer 4" are "done" or not is discriminated. If NO, the counter N is increased by "1" and the processing routine is returned to the position shown in FIG. 10A. This means that if any of "transfer 1" to "transfer 4" is "running", the processing routine can advance to the execution regarding the next queue.

If all of "transfer 1" to "transfer 4" are "done", the counter N is increased by "1" and the processing routine is returned to the position shown in the diagram. If the image process column is "done", the content of the erase column is checked. If it is "undone", the erase column in the N-th queue is changed to "running" and the task ID of the back process task which is being executed is written. The queue semaphore is released. The inspection file written in the N-th queue is read out and the erasing process is performed to the image which the inspection file has.

The erasing process denotes that the inspection file in the hard disk, a plurality of natural image files shown by the content of the inspection file, and the natural image processed image file formed by performing the natural image processes to the natural image file are erased.

When the erasing process is finished, the queue semaphore is again obtained, the content "running" is changed to "done", and the queue semaphore is released. The processing routine is returned to the first step. Since the semaphore is released at this time point while the erasing process is being performed, as for the back process task and operation process task other than the back process task which is performing the erasing process, it is important that the queue semaphore can be obtained for the purpose of performing some operation.

When the erasing process column is "running", the counter N is increased by "1" and the processing routine is returned to the position shown in FIG. 10A. When the erasing process column is "done", the queue N is deleted from a management table. When the queue is deleted, the queues on the side lower than it are sequentially shifted up. The queue semaphore is released and the processing routine is returned to the first step.

A plurality of tasks synchronously perform the operation by the queue table as mentioned above.

Figure 11B:
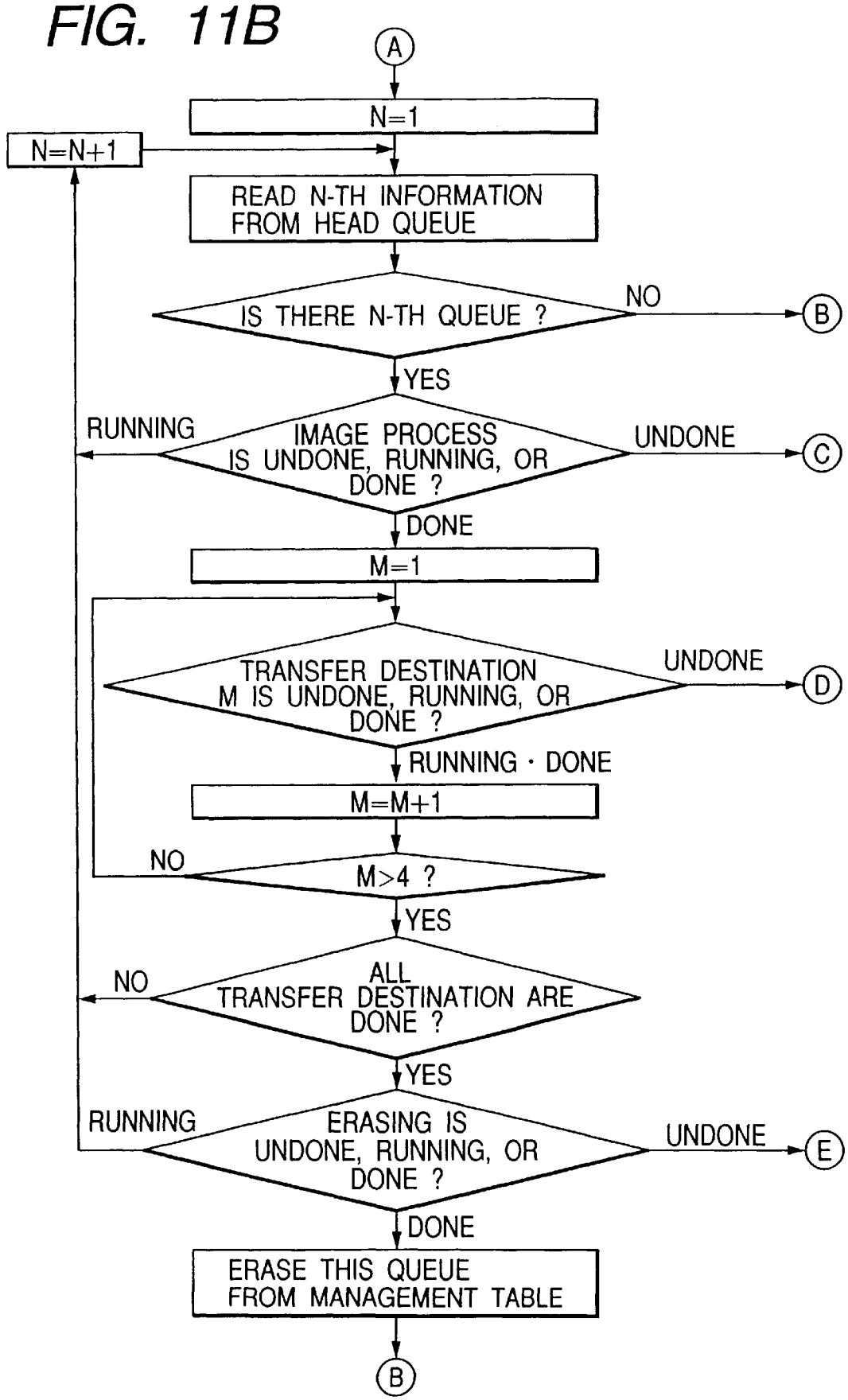
FIG. 11 which is comprised of FIGS. 11A, 11B and 11C is a flowchart showing an image process, image sending, and an image erasing process 2.
Figure 11C:
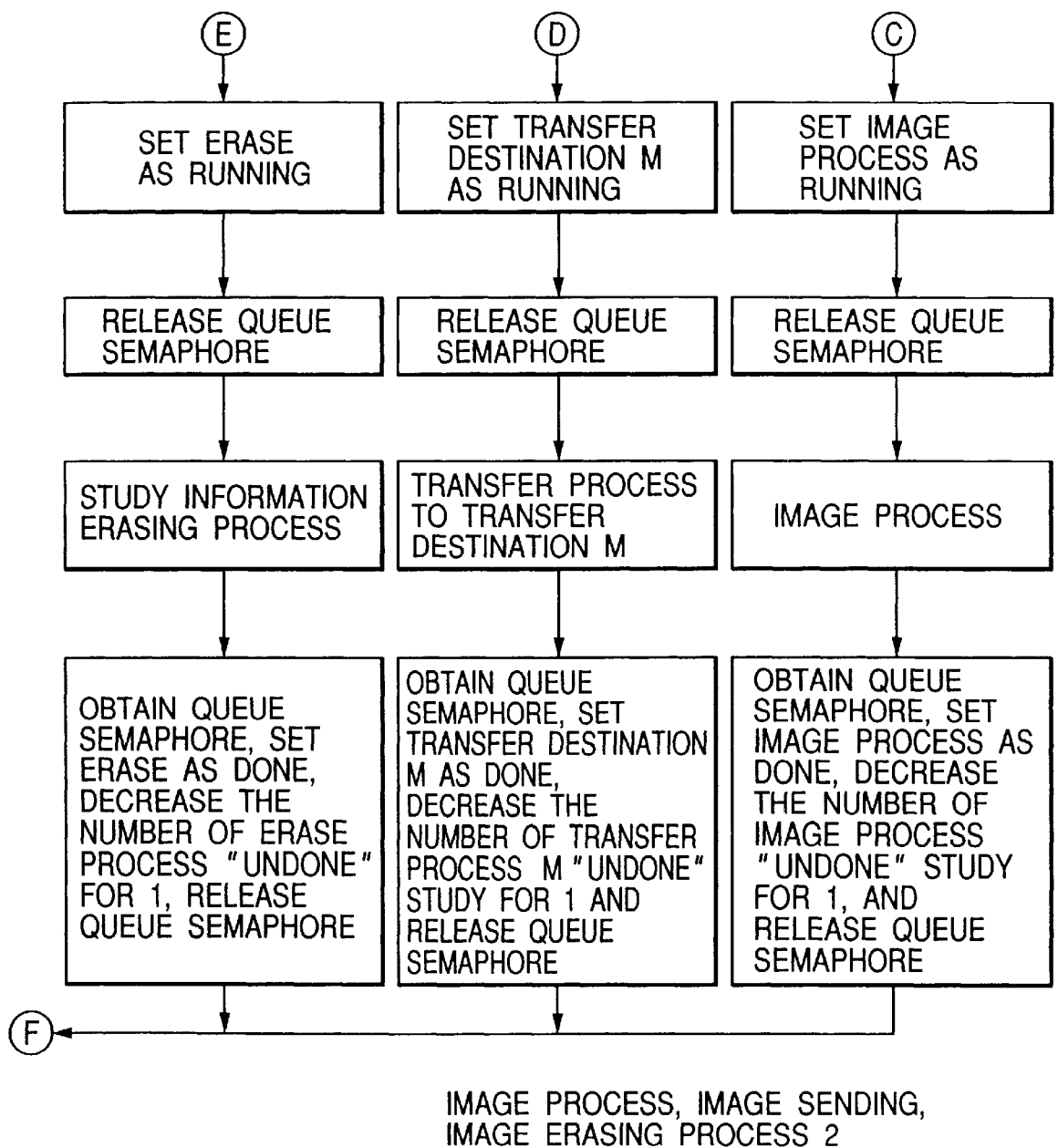

FIGS. 11A to 11C show processes to improve a processing speed by storing information into the RAM, namely, the information regarding whether it is necessary to access before accessing to the queue table stored in the nonvolatile storage device or not.

When the processing steps in FIGS. 11A to 11C are executed, in case of adding a queue into the queue table, it is assumed as a prerequisite that each of variables of the number of image process "undone" studies, the number of transfer process 1 "undone" studies, the number of transfer process 2 "undone" studies, the number of transfer process 3 "undone" studies, the number of transfer process 4 "undone" studies, and the number of erasing process "undone" studies which are stored into the RAM is increased by "1".

In FIG. 11A, the queue semaphore is first obtained. When the number of image process "undone" studies is equal to 1 or more, since the queue which needs the image processes exists, the processing routine is jumped to step of "N=1". When the number of image process "undone" studies is equal to 0, a variable of P=1 is set. When the number of transfer P "undone" studies is equal to 1 or more, since the transferring process is necessary, the processing routine is jumped to step of "N=1". The above processes are performed while changing the value of P from 1 to 4.

Finally, when the number of erasing process "undone" studies is equal to 1 or more, the processing routine is jumped to step of "N=1". In the embodiment, when all of the numbers of "undone" studies is equal to 1 or more, the processing routine is jumped to step of "N=1". The post-processes in this case are the same as those in FIGS. 10A and 10B except for a different point that a step of reducing "1" from the number of "undone" studies after completion of each of the above processes is added.

Since the queue table has been recorded in the nonvolatile storage device, when the operator finishes a power supply of the system, when the power supply is carelessly turned off, or the like, there is a case where in spite of a fact that there is a task which is not operated at the time of next activation, it is "running". For preparation of such a case, when the power supply of the system is turned on, first, if the backup copy of the queue table exists, the queue table is deleted and, after that, the backup copy is changed to the queue table and, further, all of process statuses "running" are changed to "undone", thereby keeping the consistency of the logic even at the time of turn-off of the power supply.

A storage medium according to the invention will now be described.

In the case where the system comprising the functional blocks in FIG. 1 described in the embodiment is constructed as a computer system comprising the CPU 13, ROM 15, and the like, the memory constructs the storage medium according to the invention. A program to execute the processing procedures to control the foregoing operation including the flowcharts of FIGS. 3, 6, 7, and 10A to 12 has been stored in the storage medium.

As a storage medium, it is possible to use any of a semiconductor memory, an optical disk, a magnetooptic disk, a magnetic medium, and the like. It is also possible to use any of an ROM, an RAM, a CD-ROM, a floppy disk, a magnetic tape, a magnetic card, a nonvolatile memory card, and the like.

Therefore, the functions similar to those of the embodiment and similar effects can be realized and the object of the invention can be accomplished by a method whereby the storage medium is used in a system or an apparatus other than the system or apparatus shown in FIG. 1 and the system or computer reads out and executes program codes stored in the storage medium. Similar effects can be obtained and the object of the invention can be accomplished by this method.

The functions similar to those of the embodiment and similar effects can be realized and the object of the invention can be accomplished by a method whereby the OS or the like which operates on a computer executes a part or all of the processes or a method whereby the program codes read out from the storage medium are written into a memory equipped for a function expanding board inserted in the computer or a function expanding unit connected to the computer and, thereafter, a CPU or the like equipped for the function expanding board or function expanding unit executes a part or all of the processes on the basis of instructions of the program codes.

According to the invention as described above, at the time of the compressing process of an image, a compressed image in which a compression ratio has been recorded can be easily obtained.

After the input image such as a read-out X-ray digital image or the like was reduced, a first compressing process is performed to the reduced image, its compression ratio is calculated, the compression ratio is recorded as a bit map into the input image after that, and a second compressing process is subsequently performed to the input image. With this method, since the image to be subjected to the first compressing process is small, a large load of the CPU is not placed to the compressing process and a throughput of the system can be improved.

By performing the first image process, the processed image can be used as an image for display and resources can be effectively used.

Second Embodiment

Figure 15:
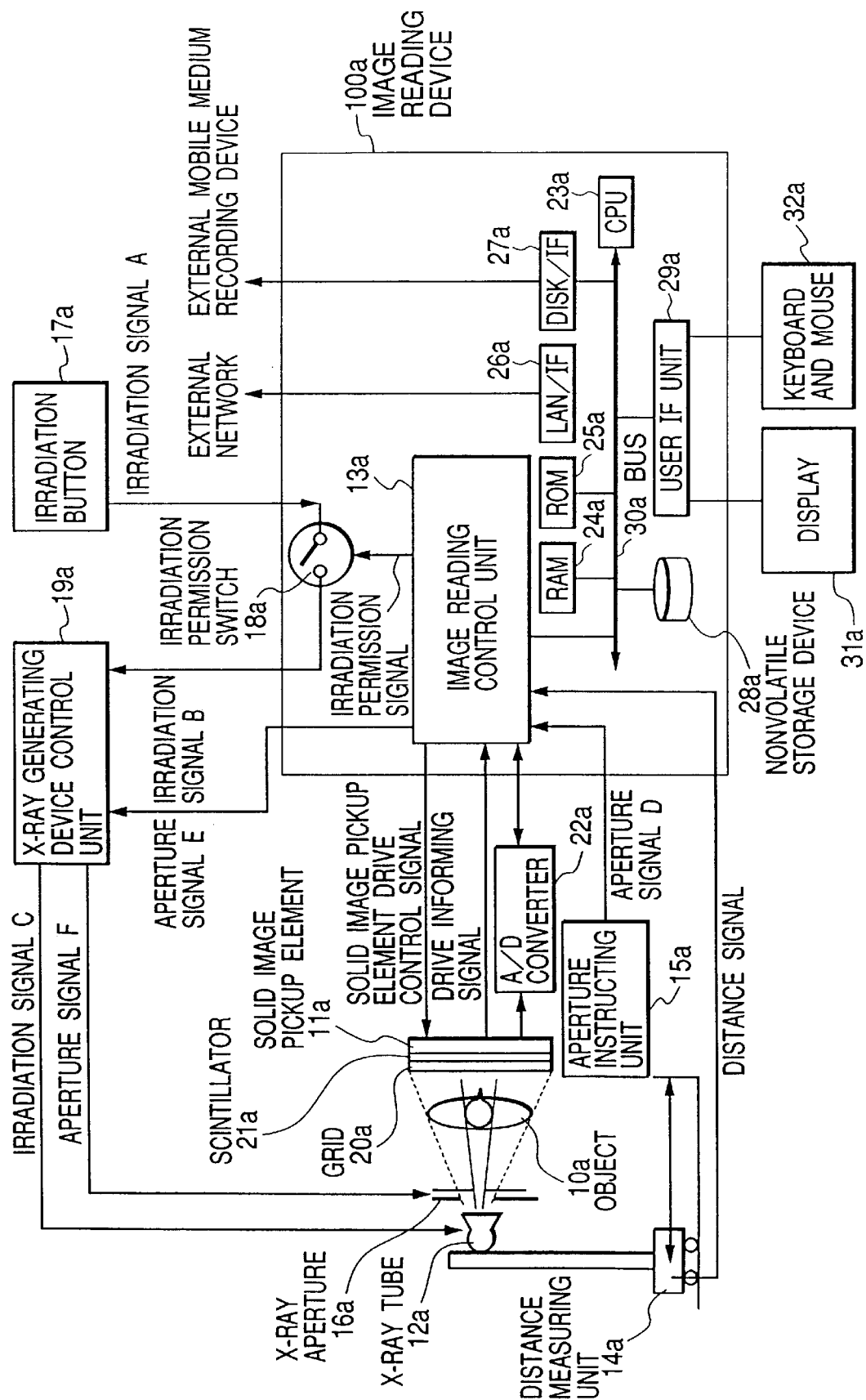
FIG. 15 is a constructional diagram of an X-ray photographing apparatus including an image processing apparatus according to the embodiment of the invention.

FIG. 15 is a constructional diagram showing the second embodiment of an X-ray digital photographing apparatus including the image processing apparatus according to the invention.

In FIG. 15, the operator arranges an object 10a to be photographed to a space between a solid image pickup element 111a and an X-ray tube 12a.

Subsequently, a photographing region of the object 10a is selected by using a user interface. By this operation, an arranging style of the object, namely, whether the PA (the X-ray is irradiated from the back side to the front side) photography is performed or the AP (the X-ray is irradiated from the front side to the back side) photography is performed is instructed. At the same time, an image reading control unit 13a in an image reading device 100a applies a voltage to the solid image pickup element 11a by using a solid image pickup element drive control signal, thereby preparing for a situation such that an image is inputted to the solid image pickup element 11a at any time.

Subsequently, the operator moves the X-ray tube 12a to a position that is away from the solid image pickup element 11a by a proper distance. At this time, a distance between the solid image pickup element 11a and X-ray tube 12a is inputted from a distance measuring unit 14a to the image reading control unit 13a.

The operator now adjusts an aperture amount by an aperture instructing unit 15a so that a target region of the object 10a which the operator wants to photograph enters a photographing region. Since an aperture signal D is transmitted like aperture signals E and F, an X-ray aperture 16a is opened or closed. The X-ray aperture 16a has a rectangular shape and can adjust an opening/closing amount with respect to each of the vertical and horizontal directions. Whether the X-ray aperture 16a properly irradiates the target region or not can be adjusted by using a lamp light.

An irradiation button 17a functions as a trigger to generate the X-ray. The irradiation signal which is generated by the irradiation button 17a is inputted to the image reading control unit 13a. In the image reading control unit 13a, whether the solid image pickup element 11a is in a state where it can convert the X-ray into an image when it receives the X-ray or not is checked as a drive informing signal and, thereafter, generates an irradiation permission signal. The irradiation permission signal turns on an irradiation permission switch 18a, thereby making the irradiation signal A conductive to the irradiation signal B. It is assumed that a switch called a second switch of the irradiation button 17a is used as an irradiation signal A.

The irradiation signal B is sent to an X-ray generating device control unit 19a. Immediately after completion of the preparation for the X-ray irradiation, the X-ray generating device control unit 19a generates the irradiation signal C, thereby allowing the X-ray to be generated from the X-ray tube 12a. The object 10a receives the irradiation of the X-ray and the transmission ray of the X-ray is inputted as an image to the solid image pickup element 11a through a grid 20a and a scintillator 21a. This image is read out and converted into a digital signal by an A/D converter 22a and sent to the image reading control unit 13a.

The image reading control unit 13a is managed by a CPU 23a. The CPU 23a is connected to an RAM 24a, an ROM 25a, an LAN/IF 26a, DISK/IF control panel 27a, a nonvolatile storage device 28a, and a user I/F unit 29a via a bus 30a. For example, a hard disk is used as a nonvolatile storage device 28a. The user I/F unit 29a has a display 31a and a keyboard and mouse 32a and performs an interface with the user.

The photographed image inputted to the image reading control unit 13a is once stored into the RAM 24a and subjected to various processes, which will be explained hereinlater, by the CPU 23a after that.

FIGS. 16A and 16B are block diagrams of an irradiation field area arrangement and a sensor position marking processing unit.

In FIGS. 16A and 16B, an irradiation field recognition is performed to the photographed image by an irradiation field recognition unit 51a, thereby calculating an irradiation field area. Several methods of recognizing the irradiation field have been proposed. When the irradiation field is recognized, a recognition result is sent to an image processing unit 52a for display. In the image processing unit 52a for display, on the basis of the photographed image and the irradiation field area result, image processes are performed so that a contrast in the irradiation field area becomes a proper contrast and a reduction image for display is formed.

Figures 17, 18:
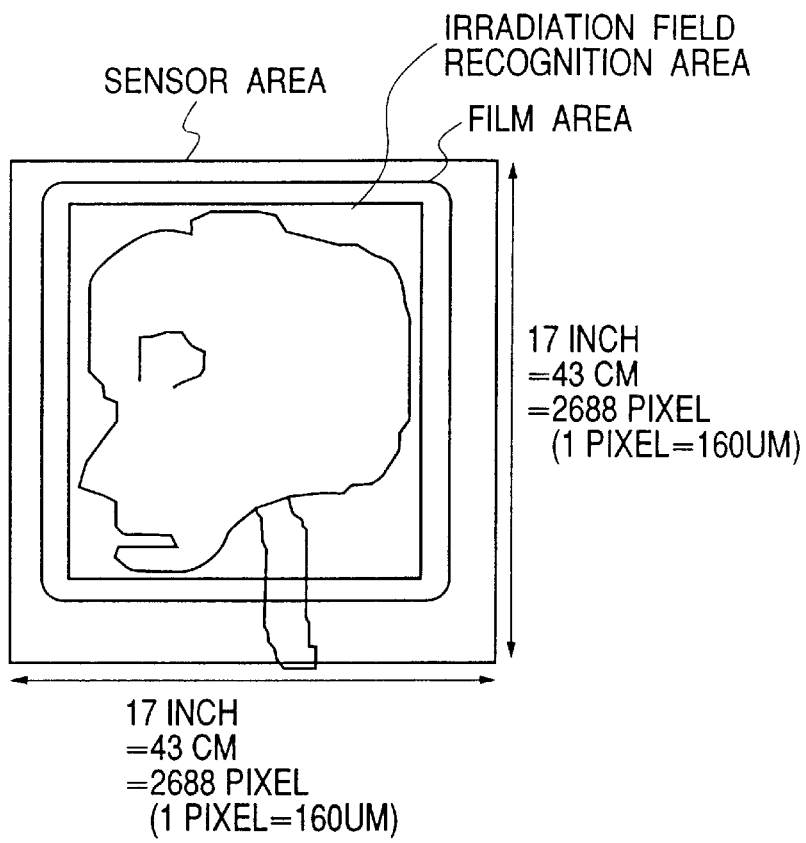
FIG. 17 is a constructional diagram showing an example of a display of an irradiation field recognition area and a film area.
FIG. 18 is a constructional diagram showing designated sizes.

The irradiation field recognition result is also sent to an irradiation area arrangement calculating unit 53a. The irradiation area arrangement calculating unit 53a performs an arrangement calculation on the basis of several preset output sizes. A calculating algorithm in this case will be described hereinlater. An output size is arranged here so as to include the irradiation field area of the original photographed image. FIG. 17 shows its example. A large square size is arranged so that the irradiation field area lies within an output size (film area) of the large square size (square of 35 cm).

FIG. 18 shows preset designated sizes. In this example, there are five kinds of designated sizes. FIG. 17 shows a case where the large square size is selected. It is optimum from a viewpoint that a surplus area is large in case of a film size larger than the large square size and such an area cannot be fully included in a film size smaller than the large square size.

Referring again to FIG. 16A, a position where the designated size is arranged is calculated by the irradiation area arrangement calculating unit 53a and a resultant position is transmitted to a unit 54a for turning/reversing an image for display. In the display image turning/reversing unit 54a, the reduction image for display is turned/reversed on the basis of a turning/reversing designation value which is instructed upon photography.

Figure 22:
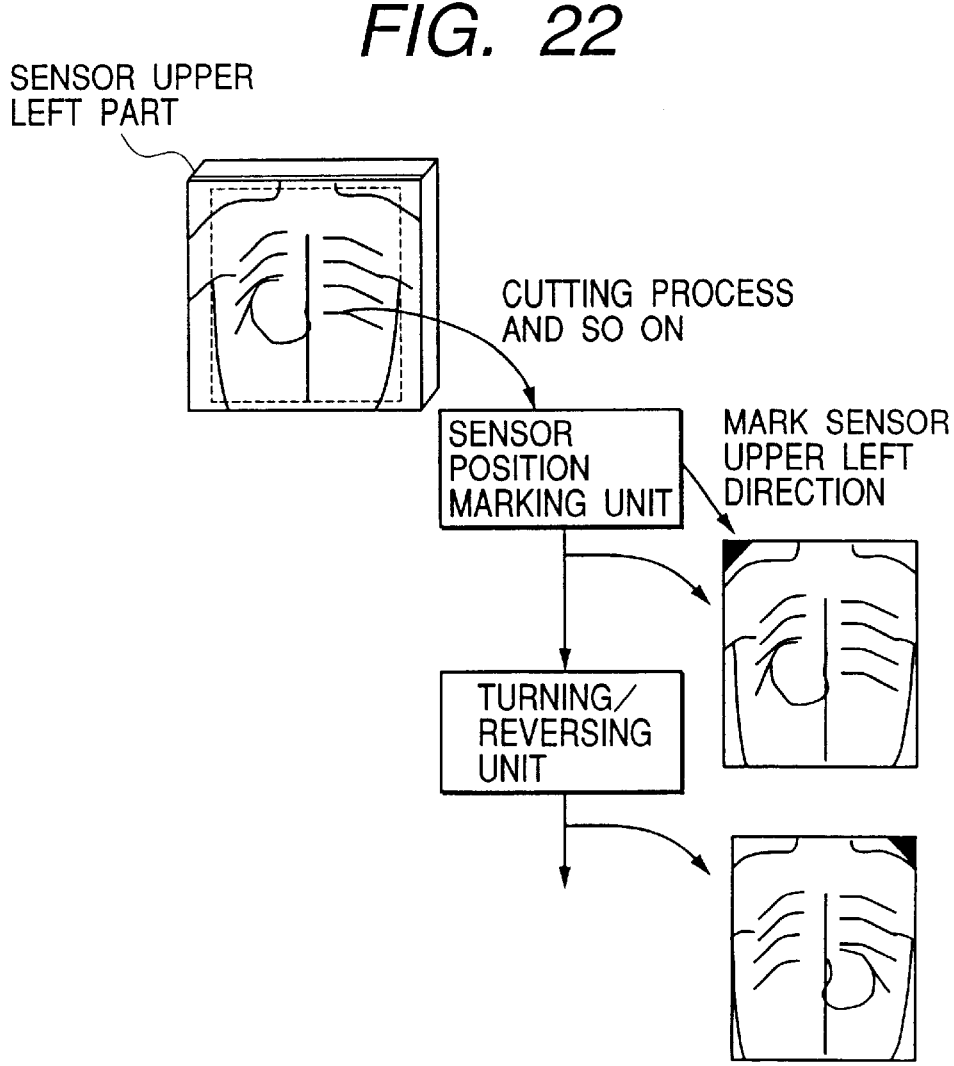
FIG. 22 is a constructional diagram showing a sensor position marking process.

For example, as shown in FIG. 22, when the operator photographs the object by PA (from the back side to the front side), if the photographed image is merely displayed under an influence in the reading direction of the sensor (solid image pickup element 11a), it is displayed in a manner opposite to that in the photograph which is usually seen by the doctor, for example, the heart is displayed on the left side. In the PA photography, therefore, it is necessary to reverse the right and left positions at the time of image display. Since there is a situation such that the image is reversed in the vertical direction depending on the direction of the head on the bed when the operator photographs, or both the PA photography and the AP photography exist even on the bed, the turning process is necessary because of similar reasons. In the display image turning/reversing unit 54a, the coordinate system of the irradiation field area arrangement coordinates has to be also converted in consideration of the reduction ratio for display and the turning/reversal.

A processing result of the display image turning/reversing unit 54a is sent to an overlay unit 55a. In the overlay unit 55a, a rectangular overlay display by the irradiation field area arrangement coordinates which were subjected to the reducing, turning, or reversing process is performed on the reduction image for display which was subjected to the turning/reversing process. This display is performed by a display unit 56a.

In the irradiation area arrangement calculating unit 53a, if the irradiation field area is not included even by the maximum output size, a fact that the irradiation field area runs over the output size is notified to the operator. For example, a warning is generated by the display on the display unit 56a.

In this case, the operator can use the following method.

Figure 19:
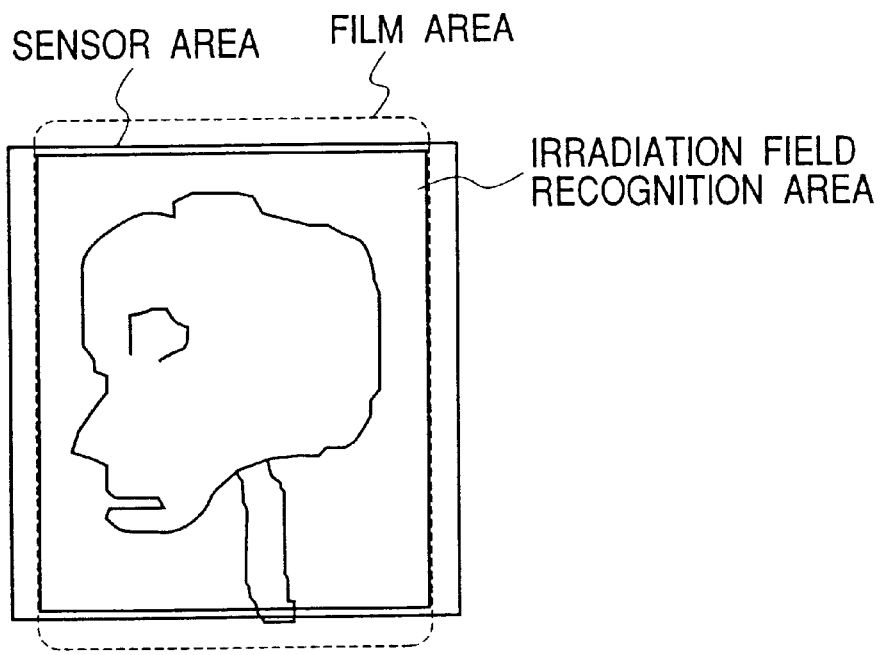
FIG. 19 is a constructional diagram showing an irradiation field reducing process.

The image in the irradiation field area is reduced so as to lie within the maximum output size. In this case, a size of image which is outputted is not equal to a life size but it is outputted smaller than the life size. FIG. 19 shows such an example. Although a broken line indicates a film area, since this area is falsely largely expressed and, in the actual process, the irradiation field recognition area is reduced and expressed, a film output of the life size or smaller is obtained.

Figure 20:
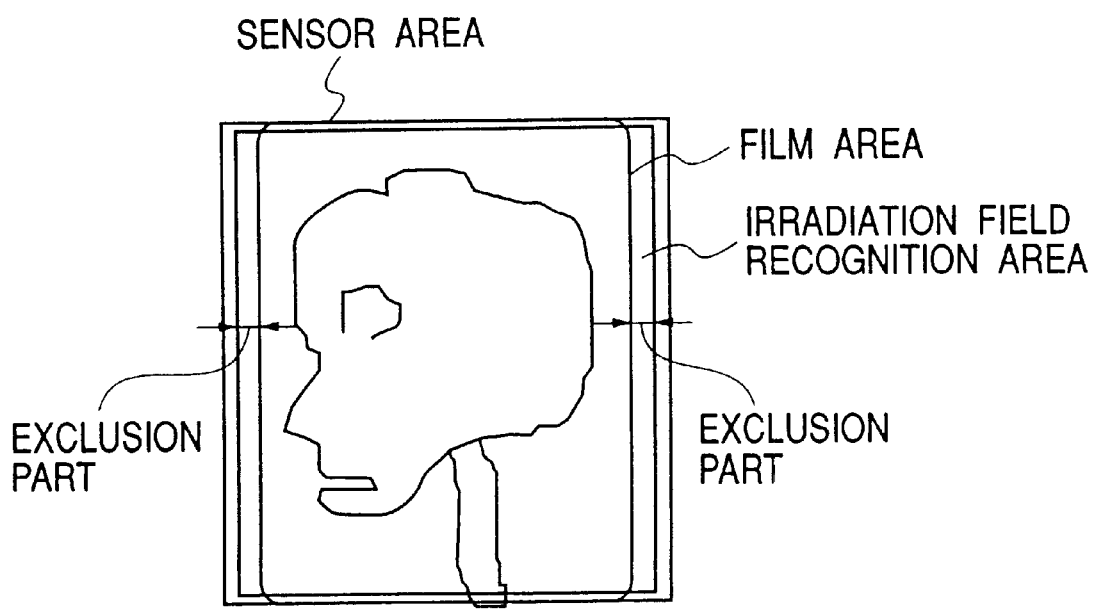
FIG. 20 is a constructional diagram showing a process to exclude a part of an irradiation field.

The irradiation field recognition area is reduced. In this case, a run-over portion is excluded and outputted although it is an irradiation field. FIG. 20 shows such an example.

Figure 21:
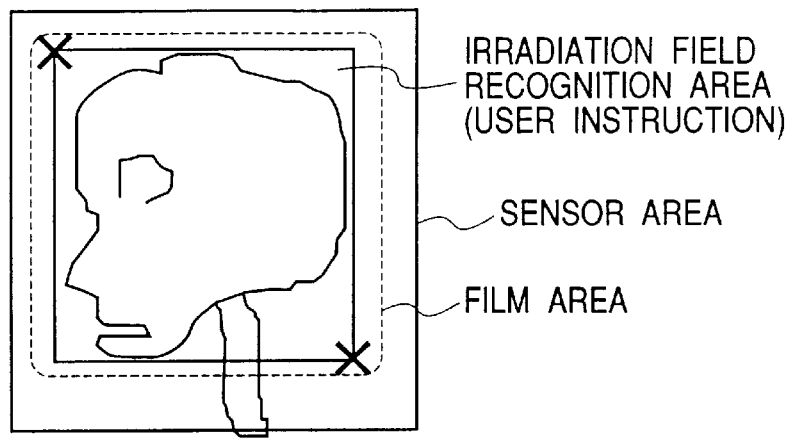
FIG. 21 is a constructional diagram showing an operator designating process.

The operator designates this area. In this case, when the operator clicks portions shown by a mark "x" at two positions by the mouse as shown in FIG. 21, this area becomes a prerequisite of the irradiation field recognition area and the foregoing ordinary process is performed. In this example, the large square size including the irradiation field recognition area is designated.

The arranging process change as mentioned above is instructed in the irradiation area arrangement calculating unit 53a in an instruction unit 57a by using the mouse here and the above excluding operation is accomplished.

Even in the turning/reversing process, it is now assumed that after the operator photographed the object by setting a mode to photograph by PA (from the back side to the front side), when the actual direction of the patient is decided, if the photographing mode has to be changed to AP (from the front side to the back side) in accordance with the condition of a disease of the patient and photograph. In this case, after the photography, the right/left reversing process has to be performed to the image. Therefore, in the instruction unit 57a, the right/left reversing process, turning process, or the like can be instructed to the turning/reversing unit. When it is instructed, the image is again displayed.

When the operator finally admitted the image arrangement, the arrangement calculation is determined. There are two kinds of methods of determining it. That is, there are a case where the operator specifically instructs it from the instruction unit 57a and a case where a time-out occurs without instructing by the operator. In the embodiment, both of them are embodied and a time-out time is set to one minute.

When the arrangement calculation is determined, the photographed images, arrangement coordinate determination values, and turning/reversing determination values are stored onto the hard disk in a temporary storage unit 58a. Those images and values are again read out and processed by a background process. The reason why the process is performed in the background is because since the processes up to the above description are performed on the reduction image and mainly performed by the logical calculation, the calculation is performed in a relatively short time, in the calculation of processes, which will be explained hereinlater, the image processes or the like are performed to the whole large photographed image of (2688×2688) pixels as a target, so that it takes a long time and there is a problem such that the user cannot advance to the next photography while those processes are being executed. By processing in the background, the operator can promptly shift to the next photographing cycle.

The photographed image read out from the hard disk is subjected to a cutting process in a cutting unit 59a from the read-out arrangement coordinate determination values. The cutting process is a process for trimming the photographed image in accordance with the arrangement coordinate determination values. The photographed image is subsequently subjected to proper image processes in an image processing unit 60a and adjusted so as to obtain the optimum contrast at the time of diagnosis. After that, the resultant image is transmitted to a sensor position marking unit 61a.

The sensor position marking unit 61a is provided as a relief measure in the case where after the operator photographed the object by setting the mode to photograph by PA (from the back side to the front side), when the actual direction of the patient is determined, the object has to be photographed by AP (from the front side to the back side) in accordance with the condition of a disease of the patient, and the operator photographed in this mode and where the operator forgets the reversing process.

That is, as shown in FIG. 22, after the cutting process was performed in the cutting unit 59a, a sensor upper left position is marked at the upper left corner of the image showing the sensor upper left portion. Even if the turning/reversing process is performed after that, how the image was photographed can be known. Since the photographed image is marked after completion of the cutting process, the marking is not erased by the cutting process.

It is not always necessary to actually write the marking information indicative of the sensor upper left position into the image but information indicating the corner on which side of the image is located in the upper left position of the sensor can be added to a header of the image. In this case, particularly, when the final image is sent to a printer or a viewer, the reception sides need to read and interpret the header information.

After the sensor position marking was performed as mentioned above, the image is transmitted to a turning/reversing unit 62a. The turning/reversing unit 62a turns or reverses the image in accordance with the turning/reversing determination values stored on the hard disk and sends the resultant image to a reduction marking unit 63a. When the irradiation field recognition area represented by FIG. 19 is reduced on the film and outputted at the life size or smaller, the reduction marking unit 63a inputs the marking so that such a reduction is specifically known. Therefore, this reducing process is limited to the case where the output medium is the printer or laser imager.

In the reducing process, many laser imagers have a function to print the output image at the life size or smaller on the laser imager side without reducing it. In the embodiment, since the image reduction depends on it, the reducing process is not performed. This point will now be described in detail hereinbelow.

A pixel size of the sensor in the embodiment is equal to 160 $\mu$m. When the image in the case where it is cut out as an image of (2048×2560) pixels is sent to the laser imager of 80 $\mu$m, an interpolation enlargement of two times is instructed and the image is sent. Thus, the image is interpolated and enlarged two times by the laser imager and outputted as an image of (4096×5120) pixels. This size is just equal to the life size.

However, if the operator specifically selects the whole area of the sensor and prints, the image size is set to (2688×2688) pixels. According to this size, in the printer of 80 $\mu$m having the buffer area of (4096×5120), although there is a remaining area of the film in the vertical direction, the image is limited to the enlargement ratio in the horizontal direction, namely, $$5120/2688=1.905$$

The image is interpolated and enlarged to about 1.9 times and printed and this magnification results in the maximum enlargement ratio.

Figure 23:
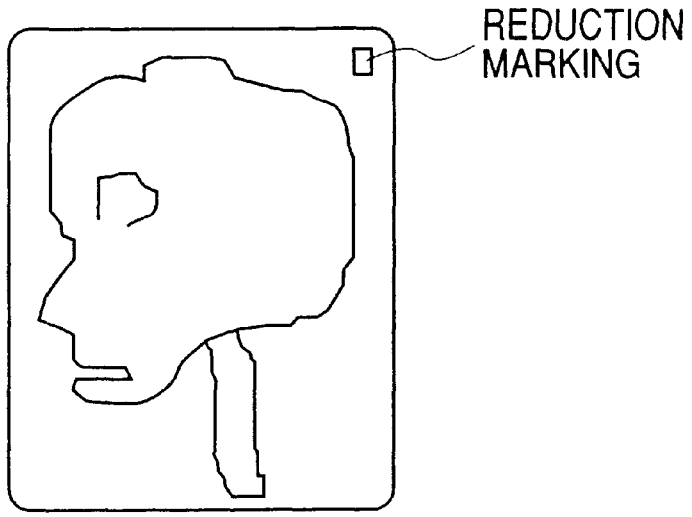
FIG. 23 is a constructional diagram showing a reduction marking.

Therefore, the enlargement of 1.905 times is instructed and the image is transferred. Although this process corresponds to the enlarging process with respect to the data, when it is seen from the operator side, since this size is smaller than the life size, this process can be regarded as a life size reducing process. FIG. 23 shows a reduction marking.

After that, the image is outputted from an output unit 64a to the outside.

An algorithm of the irradiation area arrangement calculating unit 53a will now be described also with reference to FIG. 19.

Figure 24:
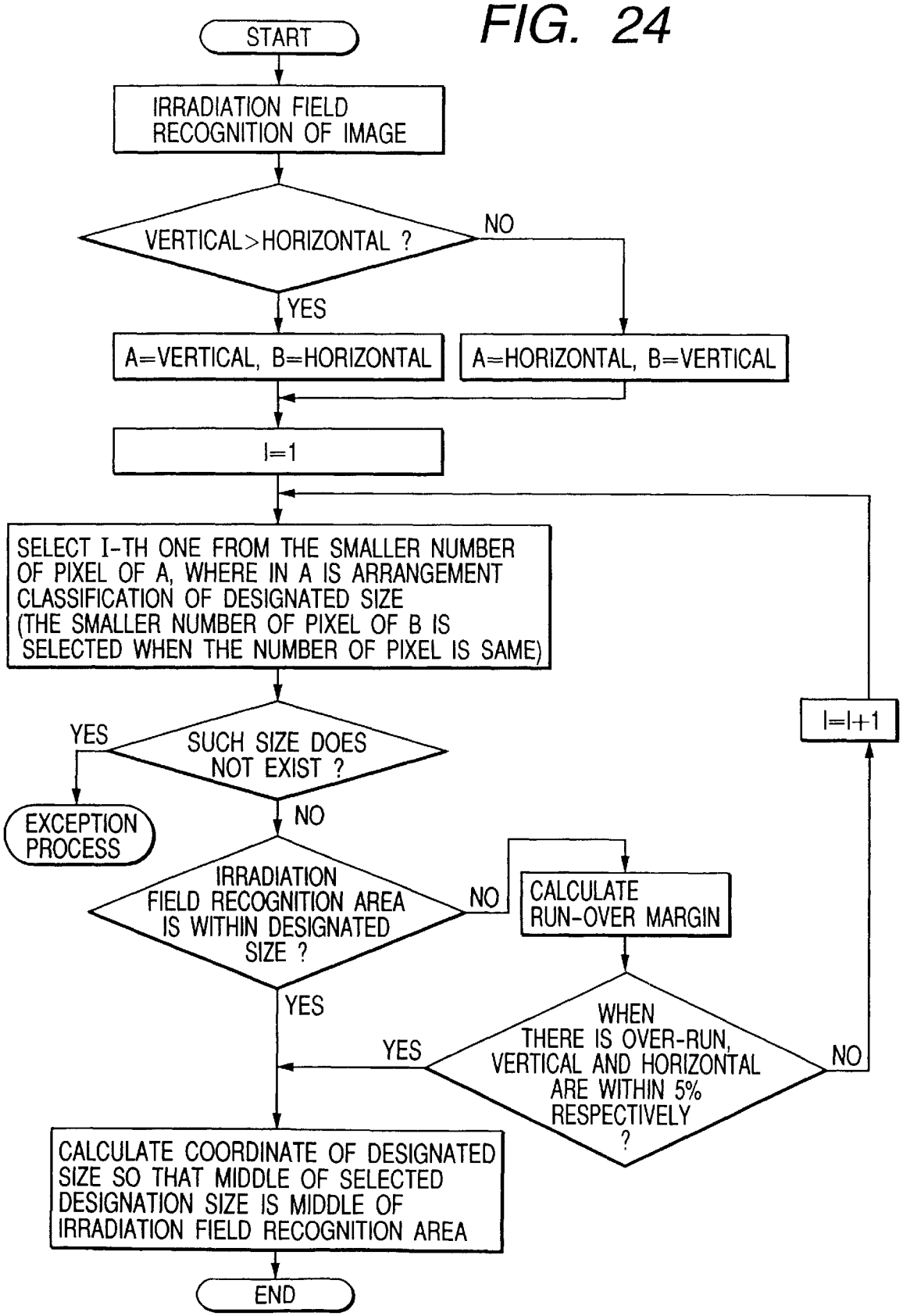
FIG. 24 is a flowchart showing a process for calculating an irradiation field area arrangement.

In FIG. 24, the irradiation field of the image is first recognized and vertical and horizontal lengths of the area are compared on the basis of a result of the irradiation field recognition. When the vertical length is longer, a symbol "A" indicates "vertical" and a symbol "B" denotes "horizontal". When the horizontal length is longer, vice versa. Subsequently, a variable l is initialized to "1". This variable is used when a table in which pre-designated sizes have been recorded is examined. It is now assumed that the table shown in FIG. 18 is used here. However, the operator can preliminary register it as an initial setting.

In the pre-designated table of FIG. 18, the sizes whose arrangement classification is "A" are checked as targets and the I-th size is selected from the smaller number of pixels of "A". At this time, when the number of pixels of "A" is the same, the size is selected from the smaller number of pixels of "B". Now assuming that "vertical" and "horizontal" are used as indicies, the sizes are arranged in order from the larger number of pixels among them. In case of the same size, the sizes are arranged in order from the larger horizontal size in case of "vertical" and arranged in order from the larger vertical size in case of "horizontal", respectively.

This table is searched from the bottom to the top. For example, now assuming that "A" denotes "vertical", the second smaller size in the vertical direction is selected. Since the smallest one is "quarter size vertical setting", the second smaller one is "large square size" or "half size vertical setting". However, when considering the horizontal pixels, it will be understood that the second smaller one is "large square size".

In the case where the table search is completed and the first size does not exist, the processing routine advances to the excluding process. For example, the fourth smaller size in the vertical setting does not exist. As already described in conjunction with FIGS. 16A and 16B, there are the three kinds of methods of the excluding process.

When the designated size exists, subsequently, whether the irradiation field area lies within such a size or not is discriminated. If YES, the coordinates of the designated size are calculated so that the center of the selected designated size becomes the center of the irradiation field recognition area. The processing routine is finished.

If the irradiation field area does not lie within the designated size, a run-over margin calculation is performed. That is, attention is paid to a principle such that, inherently, in the irradiation field recognition, a boundary of the irradiation field is obscure and even if an area around it is slightly excluded, since the area that is valid on diagnosis exists in a relatively center portion of the image, such a valid area will not be excluded.

Figure 25:
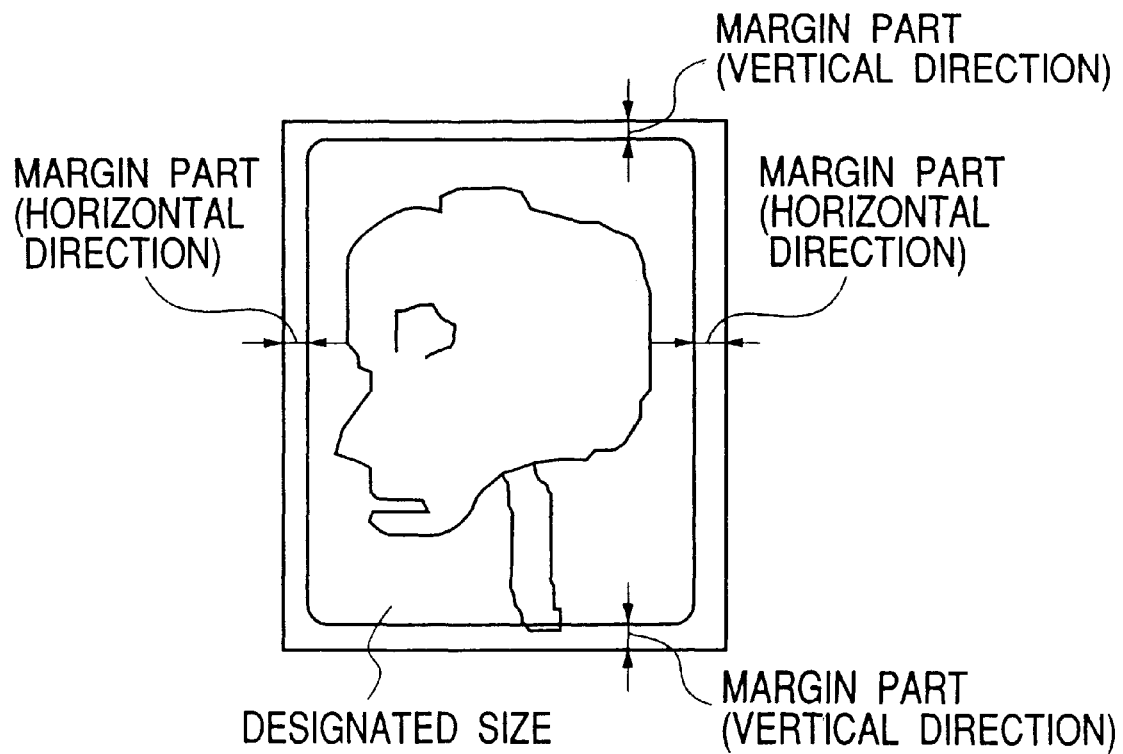
FIG. 25 is a constructional diagram showing a calculation of a run-over margin.

That is, as shown in FIG. 25, if each of the vertical and horizontal run-over portions (margins) for the size of film lies within a predetermined numerical value, the irradiation field recognition area can be equalized to the horizontal or vertical size of the designated size. This idea is also applied to a case where only the horizontal portion runs over and a case where only the vertical portion runs over.

That is, if a run-over portion exists, so long as a degree of the run-over portion is within 5% of the film length in the run-over direction (film length in the vertical direction in case of "vertical"; film length in the horizontal direction in case of "horizontal") in the embodiment, the irradiation field recognition area is narrowed than the value of the inherent irradiation field recognition calculation result so as to lie within the designated size.

If the run-over calculation result exceeds 5%, the processing routine is returned to the next portion of the initialization of the variable 1.

FIG. 26 shows a construction of the output unit 64*a* in FIG. 16B.

In the embodiment, it is assumed that the input image data (output image shown in the diagram: image data which was X-ray photographed and processed here) is compressed and outputted and, particularly, it is assumed that a character or a symbol showing the compression ratio is embedded.

In the embodiment, it is assumed that a well-known JPEG compressing method whereby an original image is discrete cosine transformed, a transformation coefficient is quantized, and it is entropy-encoded on the basis of the quantization value is used as a compressing method and a method of embedding the foregoing character or symbol into the original image before it is JPEG compressed (re-compressed) is used as a method of embedding the compression ratio.

However, the compressing method which can be used in the invention is not limited to the above method. For example, the invention also incorporates a case of using a compressing method whereby after a discrete wavelet transformation was applied in place of the discrete cosine transformation, a transformation coefficient is similarly quantized, and it is entropy-encoded.

A fluctuation of an image quality (compressing quality) due to such compression can be accomplished by changing a compressing condition such as quantization coefficient, quantization table, or the like in the JPEG compression. Information to designate the quantization coefficient or quantization table or itself is inputted as a compressing quality in FIG. 26 to a first compressing unit 641 and a second compressing unit 644. The same information is inputted to those compressing units.

Even if the compressing condition as mentioned above which is concerned with the image quality that is determined upon image compression is uniformly given, in case of using the non-reversible compressing method like a JPEG compressing method, the compression ratio variably changes in accordance with the contents of the image. Therefore, the compression ratio of each image data cannot be discriminated unless the image is actually compressed.

For example, in the JPEG compression which is used in the embodiment, when the image data is compressed under the common compressing condition, a possibility of reduction of the compression ratio in case of compressing an image such as a character image having a number of edge portions is higher than that in case of compressing a halftone image such as a photograph image.

In the embodiment, as shown in FIG. 26, the compressed image data in which the compression ratio has been written as a character or a symbol can be obtained by using: the first compressing unit 641 for compressing the input image data (output image shown in the diagram) by using the predetermined compressing condition (compressing quality: quantization coefficient, quantization table, etc.); a compression ratio calculating unit 642 for calculating a compression ratio from the compressed image data and the original image data before the compression; a compression ratio writing unit 643 for embedding the calculated compression ratio as a character or a symbol into the original image data; and the second compressing unit 644 for again compressing the image data in which the compression ratio has been written in accordance with the compressing condition.

Image compressing algorithms of the first image compressing unit 641 and second image compressing unit 644 are the same and the JPEG compressing method is used. However, the invention is not limited to such a compressing method but the discrete wavelet transformation can be used as mentioned above.

Third Embodiment

In the second embodiment, the image data which is compressed by the second compressing unit 644 is the image data in which the foregoing character or symbol has been embedded in at least a part of the original image data compressed by the first compressing unit 641. Therefore, if the image data is compressed by the JPEG compressing method, the compression ratio is generally lower than that in case of compressing by the first compressing unit 641.

In consideration of the above point, according to the third embodiment, the compression ratio when the image data is compressed by the first compressing unit 641 is not used as it is but a compression ratio when the image data is re-compressed by the second compressing unit 644 is finally predicted on the basis of the above compression ratio, the predicted compression ratio is embedded into the original image data, and thereafter, the resultant embedded image data is compressed by the second compressing unit 644.

Figure 27:
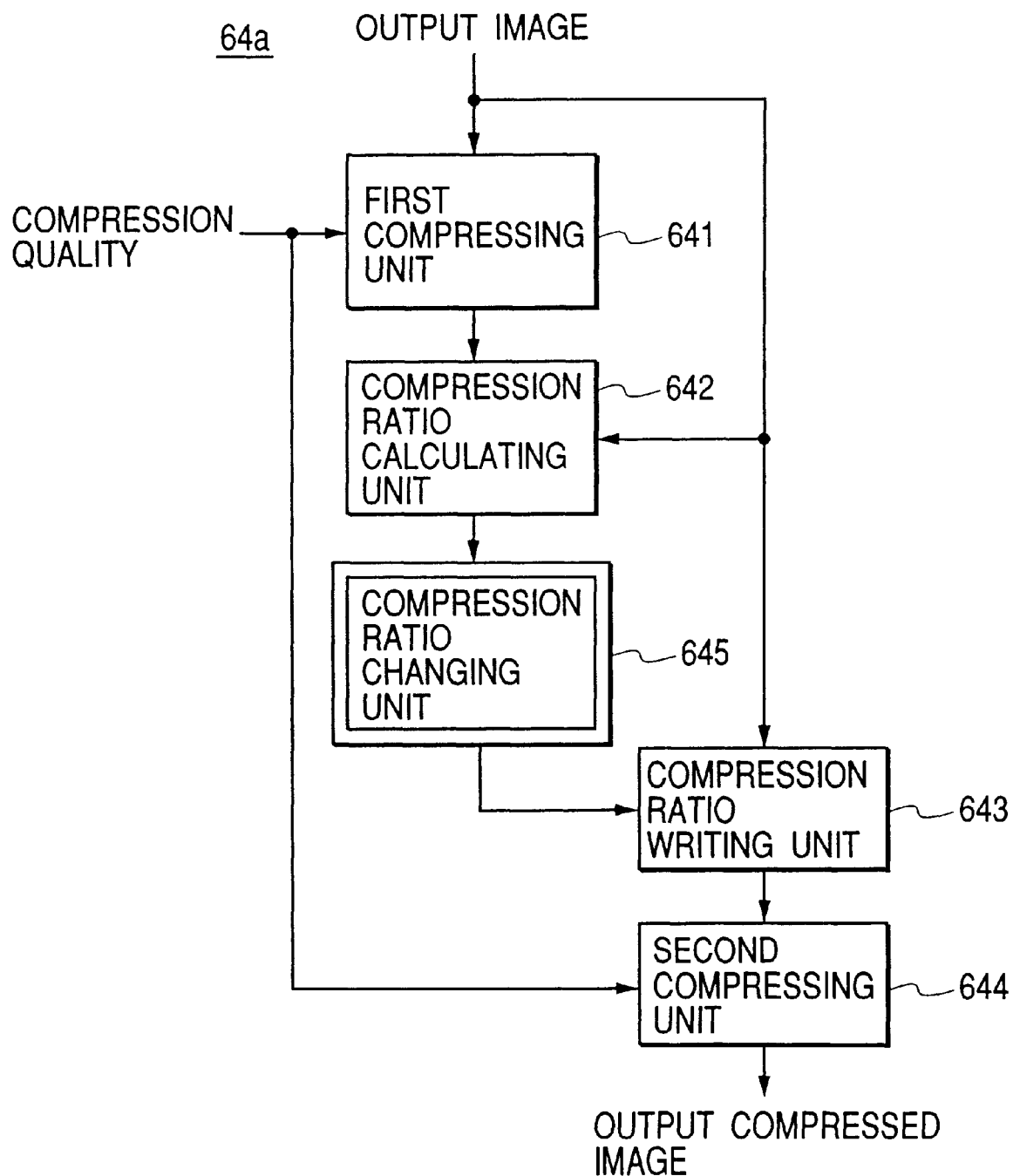
FIG. 27 is a diagram showing a construction of an output unit to perform a compression ratio writing process according to the third embodiment.

FIG. 27 shows a construction of the output unit 64*a* according to the embodiment.

To perform the above process, in the embodiment, a compression ratio changing unit 645 is provided as shown in FIG. 27. In the compression ratio changing unit 645, it is presumed that upon compression of the original image data, after the character/symbol indicative of the compression ratio was embedded, the compression ratio when the JPEG compression is again executed deteriorates to, for example, 0.95 time. The character or symbol data showing the value obtained by performing the correction of 0.95 time to the value of the original compression ratio is outputted to the compression ratio writing unit 643. The value of magnification 0.95 to correct the compression ratio can be properly changed in accordance with the compressing method, the kind of image, or the like.

Fourth Embodiment

The fourth embodiment intends to obtain similar effects by once compressing, for example, a reduction image for display confirmation without once compressing the original image data as described in the foregoing embodiments. Although not particularly described, processes and a construction of the apparatus of the fourth embodiment are similar to those in the second embodiment.

Figure 28:
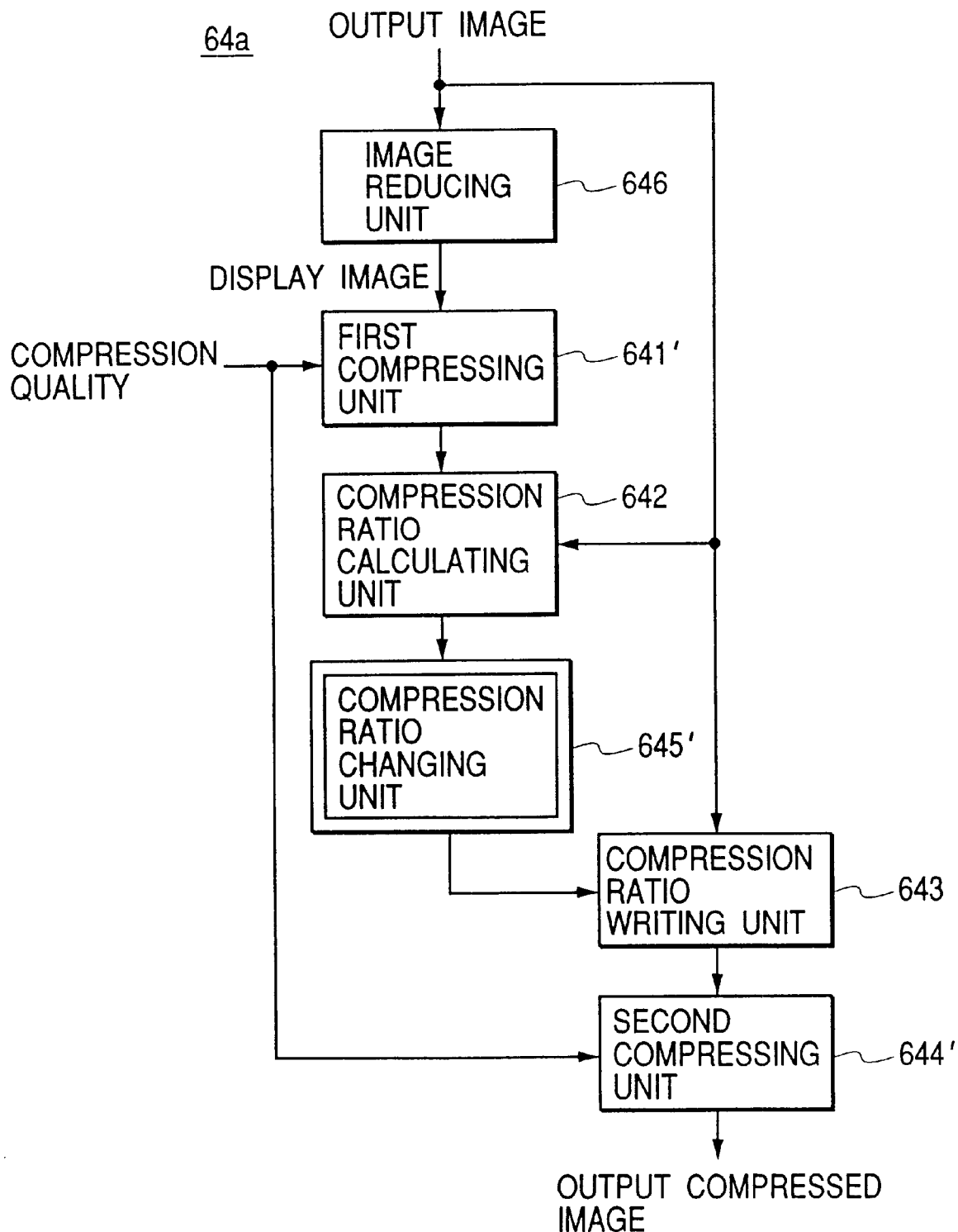
FIG. 28 is a diagram showing a construction of an output unit to perform a compression ratio writing process according to the fourth embodiment.

FIG. 28 shows a construction of the output unit 64a according to the embodiment.

In FIG. 28, after the input image (output image shown in the diagram) was reduced by an image reducing unit 646, the image data of the reduced image is compressed by a first compressing unit 641' and a compression ratio is calculated by the compression ratio calculating unit 642. It is assumed that the reduced image in this instance is, for example, an image for display and each pixel is roughly expressed by a relatively small data amount of eight bits.

Just before the image data is transferred to the outside, the compression ratio is changed by a compression ratio changing unit 645' and embedded into the image data of the original non-reduced image by the compression ratio writing unit 643 by a method, which will be explained hereinlater. The obtained image data is compressed by a second compressing unit 644'. Each pixel of the image data at this time is highly finely expressed by 12 bits.

As mentioned above, a compressing algorithm of the first compressing unit 641' to compress the image data in which each pixel consists of 8 bits and that of the second compressing unit 644' to compress the image data in which each pixel consists of 12 bits are obviously different. Therefore, the compression ratios of the first compressing unit 641' and second compressing unit 644' are different even if the character or symbol is not embedded in the image as a compression target of both of the first and second compressing units.

In the embodiment, to avoid such an inconvenience, the compression ratio changing unit 645' corrects the compression ratio calculated by the compression ratio calculating unit 642 in consideration of the difference between the compressing algorithms of the first and second compressing units 641' and 644'. Specifically speaking, such a correction is executed by increasing the compression ratio calculated by the compression ratio calculating unit 642 by, for example, 1.10 times.

Each of the embodiments has been shown and described with respect to the case of realizing many processes by software in order to easily embody the invention and explain. However, in case of perform the processes at a higher speed, they can be realized by a hardware construction. In this case as well, the spirit of the invention is not lost.

A storage medium as another embodiment of the invention will now be described.

In the case where the system comprising the blocks shown in FIGS. 15, 16, and 26 to 28 is constructed by a computer system including the CPU 23a and a memory such as an ROM 25a or the like, the memory constructs the storage medium according to the invention. Programs to execute the processes shown in the flowchart of FIG. 24 and the processing procedures to control the operation in each of the foregoing embodiments shown in FIGS. 26 to 28 are stored in the storage medium.

Any of a semiconductor memory such as ROM, RAM, or the like, an optical disk, a magnetooptic disk, a magnetic medium, and the like can be used as a storage medium. Any of a CD-ROM, a floppy disk, a magnetic tape, a magnetic card, a nonvolatile memory card, and the like can be used.

Therefore, the functions similar to those of the embodiment and similar effects can be realized and the object of the invention can be accomplished by a method whereby the storage medium is used in a system or an apparatus other than the system or apparatus shown in each drawing and the system or computer reads out and executes program codes stored in the storage medium. Similar effects can be obtained and the object of the invention can be accomplished by this method.

The functions similar to those of the embodiments and similar effects can be realized and the object of the invention can be accomplished by a method whereby the OS or the like which operates on a computer executes a part or all of the processes or a method whereby the program codes read out from the storage medium are written into a memory equipped for a function expanding board inserted in the computer or a function expanding unit connected to the computer and, thereafter, a CPU or the like equipped for the function expanding board or function expanding unit executes a part or all of the processes on the basis of instructions of the program codes.

According to the invention as described above, the input image is compressed under the predetermined compressing condition, the compression ratio is calculated from the compressed image and the input image, the compression ratio is changed on the basis of a predetermined reference, and thereafter, it is embedded into the input image, and the image in which the changed compression ratio has been embedded is again compressed under the predetermined compressing condition. Therefore, when the image is compressed, the rough compression ratio can be embedded as a bit map into the input image.

Particularly, since the reduction of the compression ratio due to the recompression is considered, the information showing the more accurate compression ratio can be embedded.

The present invention is not limited to the foregoing embodiments but many modifications and variations are possible within the spirit and scope of the appended claims of the invention.

What is claimed is:

1. An image processing apparatus comprising:
    first compressing means for compressing by using an input image;
    calculating means for calculating a compression ratio for said input image on the basis of a result of the compression by said first compressing means;
    embedding means for embedding information showing said calculated compression ratio into said input image, wherein said input image into which the information showing said calculated compression ratio is embedded is an uncompressed image; and
    second compressing means for compressing the input image in which the information showing the compression ratio has been embedded by said embedding means,
    wherein a compression algorithm used by said first compressing means and a compression algorithm used by said second compressing means are the same.

2. An apparatus according to claim 1, wherein said first compressing means compresses by using the image obtained by reducing said input image.

3. An apparatus according to claim 1, wherein said second compressing means uses a compression parameter used in said first compressing means.

4. An image processing method comprising:

a first compressing step, of compressing by using an input image;

a calculating step, of calculating a compression ratio for said input image on the basis of a result of the compression in said first compressing step;

an embedding step, of embedding information showing said calculated compression ratio into said input image, wherein said input image into which the information showing said calculated compression ratio is embedded is an uncompressed image; and a second compressing step, of compressing the input image in which the information showing the compression ratio has been embedded in said embedding step, wherein a compression algorithm used in said first compressing step and a compression algorithm used in said second compressing step are the same.

5. A computer-readable storage medium which stores a program for an image processing method, wherein said program comprises:

a first compressing step, of compressing by using an input image;

a calculating step, of calculating a compression ratio for said input image on the basis of a result of the compression in said first compressing step;

an embedding step, of embedding information showing said calculated compression ratio into said input image, wherein said input image into which the information showing said calculated compression ratio is embedded is an uncompressed image; and a second compressing step, of compressing the input image in which the information showing the compression ratio has been embedded in said embedding step, wherein a compression algorithm used in said first compressing step and a compression algorithm used in said second compressing step are the same.

6. An image processing apparatus comprising:

first compressing means for compressing an input image under a predetermined compressing condition;

calculating means for calculating a compression ratio for said input image on the basis of a result of said compression by said first compressing means;

changing means for changing a value of said calculated compression ratio on the basis of a predetermined reference;

embedding means for embedding information showing the compression ratio changed by said changing means into said input image, wherein said input image into which the information showing said calculated compression ratio is embedded is an uncompressed image; and second compressing means for compressing the input image in which said information has been embedded by said embedding means under said predetermined compressing condition, wherein a compression algorithm used by said first compressing means and a compression algorithm used by said second compressing means are the same.

7. An apparatus according to claim 6, wherein said changing means performs a change to falsely obtain the compression ratio obtained by the compression of said second compressing means.

8. An apparatus according to claim 6, wherein a discrete cosine transformation is included in said compressing algorithm.

9. An apparatus according to claim 6, wherein said embedding means embeds said information as a character or a symbol into said input image.

10. An image processing method comprising:

a first compressing step, of compressing an input image under a predetermined compressing condition;

a calculating step, of calculating a compression ratio for said input image on the basis of a result of said compression in said first compressing step;

a changing step, of changing a value of said calculated compression ratio on the basis of a predetermined reference;

an embedding step, of embedding information showing the compression ratio changed in said changing step into said input image, wherein said input image into which the information showing said calculated compression ratio changed in said changing step is embedded is an uncompressed image; and a second compressing step, of compressing the input image in which said information has been embedded in said embedding means under said predetermined compressing condition, wherein a compression algorithm used in said first compressing step and a compression algorithm used in said second compressing step are the same.

11. A computer-readable storage medium which stores a program for an image processing method, wherein said program comprises:

a first compressing step, of compressing an input image under a predetermined compressing condition;

a calculating step, of calculating a compression ratio for said input image on the basis of a result of said compression in said first compressing step;

a changing step, of changing a value of said calculated compression ratio on the basis of a predetermined reference;

an embedding step, of embedding information showing the compression ratio changed in said changing step into said input image, wherein said input image into which the information showing said calculated compression ratio changed in said changing step is embedded is an uncompressed image; and a second compressing step, of compressing the input image in which said information has been embedded in said embedding means under said predetermined compressing condition, wherein a compression algorithm used in said first compressing step and a compression algorithm used in said second compressing step are the same.

12. An image processing apparatus comprising:

first compressing means for compressing by using an input image;

calculating means for calculating a compression ratio for said input image on the basis of a result of the compression by said first compression means;

embedding means for embedding information showing said calculated compression ratio into said input image, wherein said input image into which the information showing said calculated compression ratio is embedded is an uncompressed image; and second compressing means for compressing the input image in which the information showing the compression ratio has been embedded by said embedding means, wherein said first compressing means compresses an image obtained by reducing said input image.

13. An image processing method comprising:

a first compressing step, of compressing by using an input image;

a calculating step, of calculating a compression ratio for said input image on the basis of a result of the compression in said first compression step;

an embedding step, of embedding information showing said calculated compression ratio into said input image, wherein said input image into which the information showing said calculated compression ratio is embedded is an uncompressed image; and a second compressing step, of compressing the input image in which the information showing the compression ratio has been embedded in said embedding step, wherein said first compressing step compresses an image obtained by reducing said input image.

14. A computer-readable storage medium which stores a program for an image processing method, wherein said program comprises:

a first compressing step, of compressing by using an input image;

a calculating step, of calculating a compression ratio for said input image on the basis of a result of the compression in said first compression step;

an embedding step, of embedding information showing said calculated compression ratio into said input image, wherein said input image into which the information showing said calculated compression ratio is embedded is an uncompressed image; and a second compressing step, of compressing the input image in which the information showing the compression ratio has been embedded in said embedding step, wherein said first compressing step compresses an image obtained by reducing said input image.

* * * * *

UNITED STATES PATENT AND TRADEMARK OFFICE
CERTIFICATE OF CORRECTION

PATENT NO. : 6,643,405 B1
APPLICATION NO. : 09/407301
DATED : November 4, 2003
INVENTOR(S) : Tsukasa Sako Page 1 of 1

It is certified that error appears in the above-identified patent and that said Letters Patent is hereby corrected as shown below:

<u>COLUMN 5</u>:

Line 55, "he" should read --the--.

<u>COLUMN 18</u>:

Line 46, "preliminary" should read --preliminarily--.

Signed and Sealed this

Seventeenth Day of November, 2009

David J. Kappos
*Director of the United States Patent and Trademark Office*